(12) United States Patent
Ye et al.

(10) Patent No.: US 8,938,009 B2
(45) Date of Patent: Jan. 20, 2015

(54) LAYERED ENCODED BITSTREAM STRUCTURE

(75) Inventors: Yan Ye, San Diego, CA (US); Marta Karczewicz, San Diego, CA (US); Rahul Panchal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1295 days.

(21) Appl. No.: 12/169,451

(22) Filed: Jul. 8, 2008

(65) Prior Publication Data

US 2009/0175349 A1 Jul. 9, 2009

Related U.S. Application Data

(60) Provisional application No. 60/979,734, filed on Oct. 12, 2007.

(51) Int. Cl.
*H04N 7/12* (2006.01)
*H04N 19/00* (2014.01)

(52) U.S. Cl.
CPC ................................ *H04N 7/26946* (2013.01)
USPC .................. 375/240.23; 375/240.01

(58) Field of Classification Search
None
See application file for complete search history.

(56) References Cited

U.S. PATENT DOCUMENTS

| | | | |
|---|---|---|---|
| 5,260,693 A * | 11/1993 | Horsley | ........................... 341/67 |
| 5,751,694 A | 5/1998 | Toft | |
| 6,345,121 B1 | 2/2002 | Matsumoto | |
| 6,414,608 B1 | 7/2002 | Nishida et al. | |
| 6,549,671 B1 | 4/2003 | Miyagoshi et al. | |
| 6,646,578 B1 | 11/2003 | Au | |
| 7,469,070 B2 | 12/2008 | Winger | |
| 7,664,182 B2 | 2/2010 | Kadono et al. | |
| 8,335,265 B2 * | 12/2012 | Hannuksela et al. | .... 375/240.25 |

(Continued)

FOREIGN PATENT DOCUMENTS

| | | |
|---|---|---|
| CN | 1225777 A | 8/1999 |
| EP | 1619901 A2 | 1/2006 |

(Continued)

OTHER PUBLICATIONS

Bao Y et al: "FGS complexity reduction" Joint Video Team (JVT) of ISO/IEC MPEG & ITU-T VCEG(ISO/IEC JTC1/SC29/WG11 and ITU-TSG16 Q6), XX, XX, No. JVT-T087, Dec. 20, 2006, XP030006574.

(Continued)

*Primary Examiner* — Faruk Hamza
*Assistant Examiner* — Thinh Tran
(74) *Attorney, Agent, or Firm* — Todd E. Marlette

(57) ABSTRACT

This disclosure describes techniques for generating a layered encoded bitstream structure that exploits correlation in header information among video blocks of a coded unit of video data. A video encoder configured to operate in accordance with the techniques of this disclosure separates header information of the video blocks of a slice (or other coded unit) from the residual information of the video blocks of the slice. The video encoder run-length encodes the header information of the video blocks to better exploit the correlation of the header information among the blocks of the slice. After encoding the header information of the blocks of the slice, the video encoder encodes the residual information for each of the blocks of the slice. The video encoder transmits the encoded header information as a first sequence of bits and transmits the encoded residual information as second sequence of bits.

73 Claims, 10 Drawing Sheets

(56) References Cited

U.S. PATENT DOCUMENTS

| | | |
|---|---|---|
| 2001/0022856 A1 | 9/2001 | Matsumoto |
| 2001/0055336 A1 | 12/2001 | Krause et al. |
| 2003/0202594 A1 | 10/2003 | Lainema |
| 2004/0240559 A1 | 12/2004 | Prakasam et al. |
| 2004/0268329 A1 | 12/2004 | Prakasam |
| 2005/0053158 A1* | 3/2005 | Regunathan et al. .... 375/240.25 |
| 2005/0152448 A1* | 7/2005 | Crinon et al. ............ 375/240.01 |
| 2005/0249291 A1 | 11/2005 | Gordon et al. |
| 2006/0022848 A1 | 2/2006 | Nomura |
| 2006/0115000 A1 | 6/2006 | Otsuka |
| 2006/0126955 A1 | 6/2006 | Srinivasan |
| 2007/0030180 A1 | 2/2007 | Yang et al. |
| 2007/0046504 A1* | 3/2007 | Ridge et al. ...................... 341/50 |
| 2007/0097850 A1 | 5/2007 | Park et al. |
| 2007/0160302 A1 | 7/2007 | Han et al. |
| 2007/0171975 A1 | 7/2007 | Smith et al. |
| 2007/0200737 A1 | 8/2007 | Gao et al. |
| 2007/0223579 A1 | 9/2007 | Bao |
| 2008/0240252 A1 | 10/2008 | He |
| 2009/0175334 A1 | 7/2009 | Ye et al. |
| 2013/0057646 A1* | 3/2013 | Chen et al. ........................ 348/43 |
| 2013/0188699 A1* | 7/2013 | Joshi et al. ............... 375/240.12 |

FOREIGN PATENT DOCUMENTS

| | | |
|---|---|---|
| GB | 2434270 A | 7/2007 |
| JP | H09135227 A | 5/1997 |
| JP | 10191324 A | 7/1998 |
| JP | 10510132 | 9/1998 |
| JP | H10276436 A | 10/1998 |
| JP | 11122619 A | 4/1999 |
| JP | H11317942 A | 11/1999 |
| JP | 2000013800 A | 1/2000 |
| JP | 2001057520 A | 2/2001 |
| JP | 2003032676 A | 1/2003 |
| JP | 2003153265 A | 5/2003 |
| JP | 2006157678 A | 6/2006 |
| JP | 2007020002 A | 1/2007 |
| JP | 4855417 B2 | 1/2012 |
| KR | 20060004707 A | 1/2006 |
| KR | 20060007786 | 1/2006 |
| RU | 2004131857 | 4/2005 |
| TW | 200726259 | 7/2007 |
| WO | 9713374 A1 | 4/1997 |
| WO | WO03084076 A1 | 10/2003 |
| WO | WO2006042160 | 4/2006 |
| WO | WO2007010690 A1 | 1/2007 |
| WO | WO2007027402 A2 | 3/2007 |
| WO | WO2007063612 A1 | 6/2007 |
| WO | WO2007081085 A1 | 7/2007 |
| WO | WO2007112417 | 10/2007 |

OTHER PUBLICATIONS

International Search Report & Written Opinion—PCT/US2008/079634, International Search Authority—European Patent Office—Apr. 8, 2009.

Ye, Y., et al., "Improvements to FGS Layer Variable Length Coder," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, No. JVT-S066, Mar. 31, 2006, XP002458086, pp. 1-10.

Taiwan Search Report—TW097139299—TIPO—Mar. 11, 2012.

Ye (QUALCOMM): "Improved intra coding", 33. VCEG Meeting; 82. MPEG Meeting; Oct. 20, 2007; Shenzhen; (Video Coding Experts Group of ITU-T SG.16), No. VCEG-AG11, Oct. 20, 2007, XP030003615, ISSN: 0000-0095.

* cited by examiner

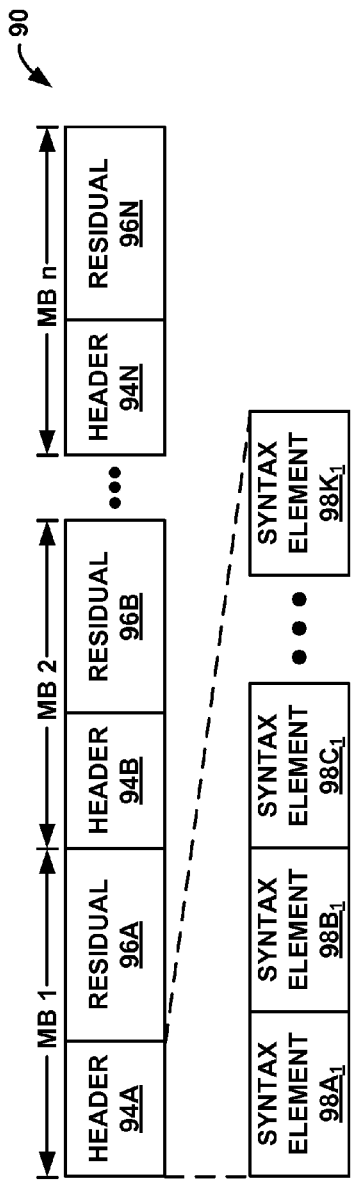
FIG. 7A
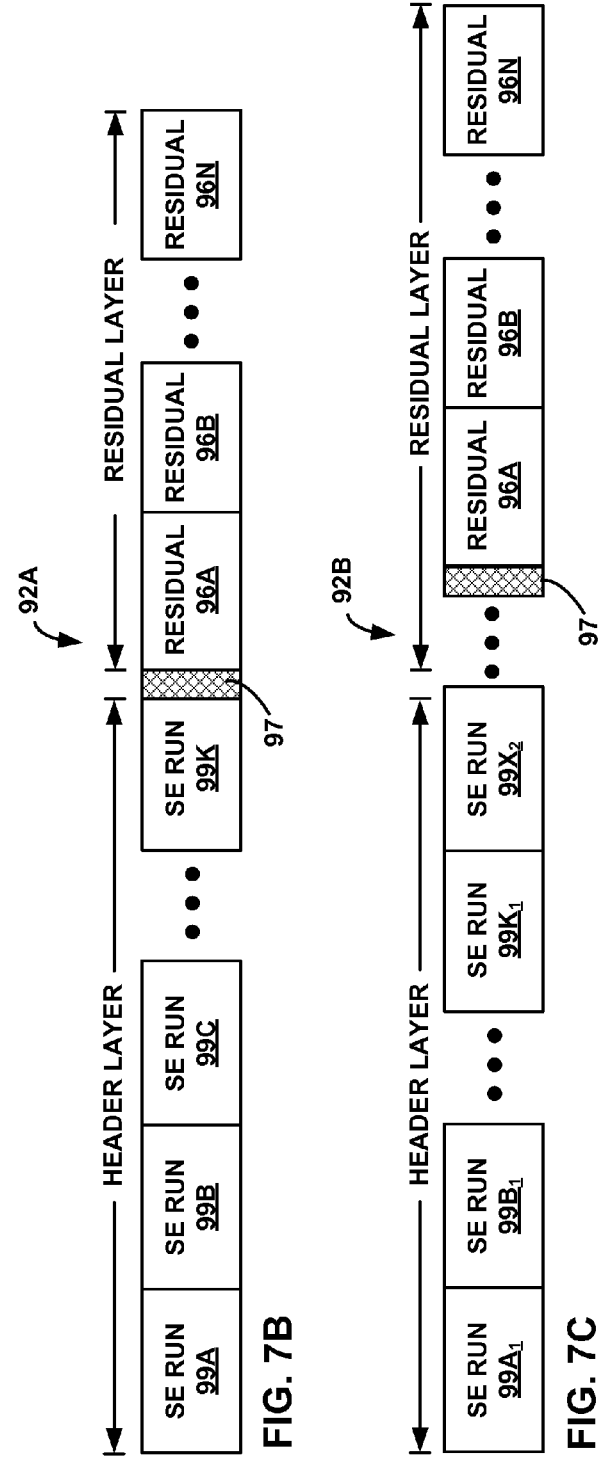
FIG. 7B
FIG. 7C

LAYERED ENCODED BITSTREAM STRUCTURE

This application claims the benefit of U.S. Provisional Application No. 60/979,734, filed Oct. 12, 2007, the entire content of which is incorporated herein by reference.

TECHNICAL FIELD

This disclosure relates to digital video coding and, more particularly, coding block header information of a video sequence.

BACKGROUND

Digital video capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as MPEG-2, MPEG-4, or H.264/MPEG-4, Part 10, commonly called Advanced Video Coding (AVC), to transmit and receive digital video more efficiently. Video compression techniques perform spatial and temporal prediction to reduce or remove redundancy inherent in video sequences.

In video coding, video compression often includes spatial prediction, motion estimation and motion compensation. Intra-coding relies on spatial prediction to reduce or remove spatial redundancy between video blocks within a given video frame. Inter-coding relies on temporal prediction to reduce or remove temporal redundancy between video blocks of successive video frames of a video sequence. For inter-coding, a video encoder performs motion estimation to track the movement of matching video blocks between two or more adjacent frames. Motion estimation generates motion vectors, which indicate the displacement of video blocks relative to corresponding prediction video blocks in one or more reference frames. Motion compensation uses the motion vectors to locate and generate the prediction video blocks from a reference frame. After motion compensation, a block of residual information is generated by subtracting the prediction video block from the original video block to be coded. Thus, the residual information quantifies the differences between the prediction video block and the video block being coded so that upon identifying the prediction video block and the residual information, the coded video block can be reconstructed at the decoder.

The video encoder may apply transform, quantization and entropy coding processes to further reduce the bit rate associated with communication of the block of residual information. Entropy coding generally involves the application of arithmetic codes or variable length codes (VLCs) to further compress residual coefficients produced by the transform and quantization operations. Examples include context-adaptive binary arithmetic coding (CABAC) and context-adaptive variable length coding (CAVLC), which may be used as alternative entropy coding modes in some encoders. A video decoder performs inverse operations to reconstruct the encoded video, using the motion information and residual information for each of the blocks.

SUMMARY

This disclosure describes techniques for generating a layered encoded bitstream structure that exploits correlation in header information among video blocks of a coded unit of video data. A video encoder configured to operate in accordance with the techniques of this disclosure separates header information of the video blocks of the slice (or other coded unit) from the residual information of the video blocks of the slice. The header information of each of the blocks may include a plurality of header syntax elements, such as a block type syntax element, prediction mode syntax element, partition size syntax element, motion vector syntax element, coded block pattern syntax element, or other type of syntax element.

The video encoder may arrange the header syntax elements of the blocks into groups based on the type of header syntax element. For example, the video encoder may group block type syntax elements of each of the blocks together, group prediction mode syntax elements of each of the blocks together and so on. The video encoder run-length encodes the groups of syntax elements to better exploit the correlation of the header information among the blocks of the slice. For a number of blocks of the slice with the same block type syntax element, for example, the video encoder may encode the block type of the blocks of the slice as a run of N, where N is the number of consecutive blocks in the slice having the same block type.

After encoding each of the groups of header syntax elements, the video encoder may encode the residual information for each of the blocks of the slice. The encoded header information for the blocks of the slice may be viewed as one "layer" of the bitstream and the residual information may be viewed as another "layer" of the bitstream. In other words, the video encoder may encode a first sequence of bits that correspond with the encoded header information of the blocks of the slice and encode a second sequence of bits that corresponds with the encoded residual information of the blocks of the slice.

In one aspect, a method of encoding video data comprises encoding header information of a plurality of video blocks of a coded unit of video data in a first sequence of bits of an encoded bitstream and encoding residual information of the plurality of video blocks in a second sequence of bits of the encoded bitstream.

In another aspect, an encoding device comprises a first encoding module that encodes header information of a plurality of video blocks of a coded unit of video data in a first sequence of bits of an encoded bitstream and a second encoding module that encodes residual information of the plurality of video blocks in a second sequence of bits of the encoded bitstream.

In another aspect, a computer-readable medium comprising instructions to cause a processor to encode header information of a plurality of video blocks of a coded unit of video data in a first sequence of bits of an encoded bitstream and encode residual information of the plurality of video blocks in a second sequence of bits of the encoded bitstream.

In another aspect, an encoding device comprises means for encoding header information of a plurality of video blocks of a coded unit of video data in a first sequence of bits of an encoded bitstream and means for encoding residual information of the plurality of video blocks in a second sequence of bits of the encoded bitstream.

In another aspect, a method of decoding video data comprises decoding a first sequence of bits of an encoded bitstream to obtain header information of a plurality of video blocks of a coded unit, decoding a second sequence of bits of the encoded bitstream to obtain residual information of the plurality of video blocks, and associating residual information of each of the plurality of video blocks with corresponding header information.

In another aspect, a decoding device comprises at least one decoder module that decodes a first sequence of bits of an encoded bitstream to obtain header information of a plurality of video blocks of a coded unit and decodes a second sequence of bits of the encoded bitstream to obtain residual information of the plurality of video blocks and a header association module that associates residual information of each of the plurality of video blocks with corresponding header information.

In another aspect, a computer-readable medium comprising instructions to cause at least one processor to decode a first sequence of bits of an encoded bitstream to obtain header information of a plurality of video blocks of a coded unit, decode a second sequence of bits of the encoded bitstream to obtain residual information of the plurality of video blocks and associate residual information of each of the plurality of video blocks with corresponding header information.

In another aspect, a decoding device comprises means for decoding a first sequence of bits of an encoded bitstream to obtain header information of a plurality of video blocks of a coded unit, means for decoding a second sequence of bits of the encoded bitstream to obtain residual information of the plurality of video blocks and means for associating residual information of each of the plurality of video blocks with corresponding header information.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 7A-7C illustrate example encoded bitstream structures.

DETAILED DESCRIPTION

Figure 1:
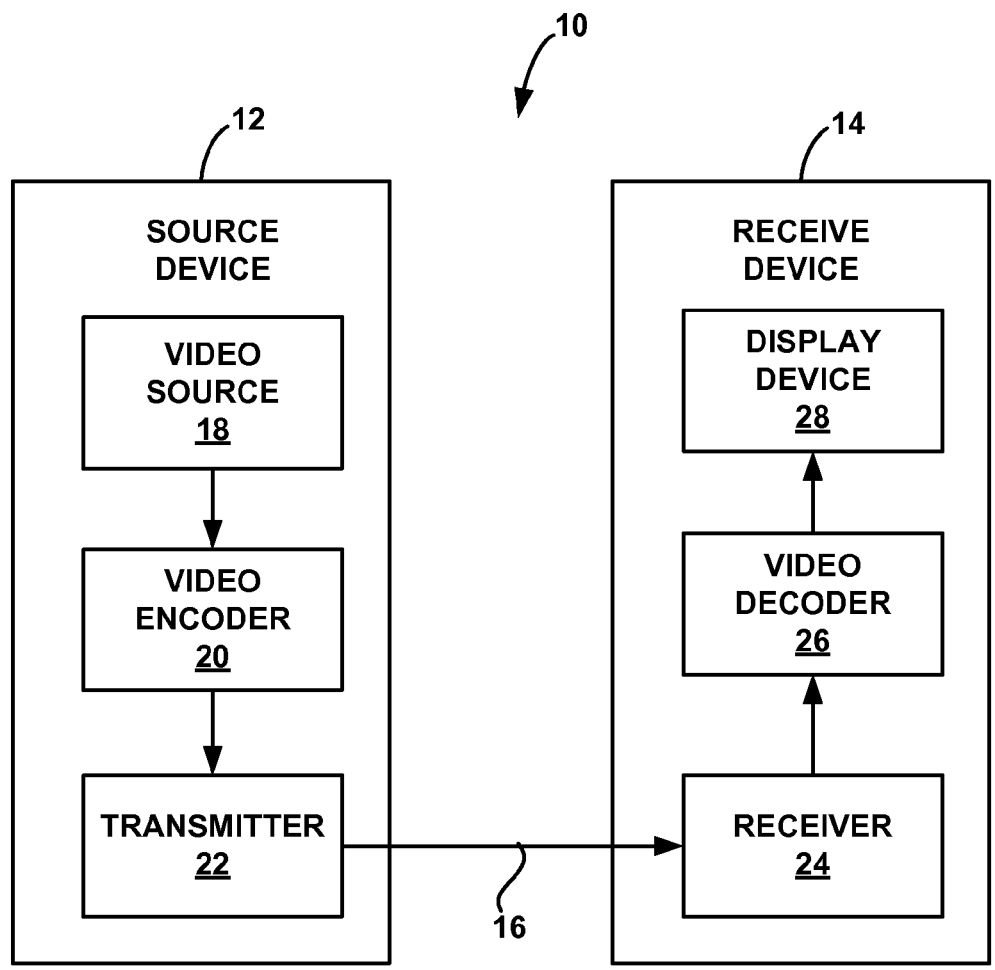
FIG. 1 is a block diagram illustrating a video encoding and decoding system.

This disclosure describes techniques for coding video data. Video data may be a series of video frames of a video sequence. A video encoder may divide each of the video frames into a plurality of blocks of pixels or blocks of transform coefficients (referred to herein as "blocks") in order to encode the video data. The video encoder then encodes each of the blocks of the series of video frames and outputs an encoded bitstream. For each block, for example, the video encoder may encode header information for the block and residual information for the block. The header information of each block may include a number of syntax elements that identify particular characteristics of the block, such as a block type, prediction mode, partition size, motion vector, coded block pattern, change of quantization parameter from previous block (delta QP), transformation size and the like. The header information is used by the decoder to generate a prediction block. The residual information of each block quantifies differences between the block and one or more prediction blocks so that upon identifying the header information used to generate the prediction block and the residual information, the coded video block can be reconstructed at the decoder.

A conventional video encoder encodes the video blocks in a block by block manner. In other words, the conventional video encoder encodes header information of a first block followed by corresponding residual information of the first block and then encodes header information of a second block followed by corresponding residual information for the second block. The conventional video encoder continues to encode the video blocks in a block by block manner until all the blocks of a coded unit (e.g., a slice or the frame) are encoded. In this manner, the conventional video encoder may be viewed as generating a block by block encoded bitstream structure.

The header information for a number of blocks of the coded unit may be spatially correlated. In other words, a number of blocks of a slice (or other coded unit) may include similar block header information, i.e., one or more of the same header syntax elements. For example, a number of blocks of the slice may have a same block type, a same delta QP or the like. By taking advantage of such correlation, better coding efficiency may be achieved by an entropy coder. When an entropy coder uses arithmetic coding, such correlation is usually exploited by forming arithmetic coding contexts based on the values of the same syntax element of the neighboring blocks. When an entropy coder uses variable length coding (VLC), such correlation is usually exploited by predicting the value of the current syntax element from the values of the same syntax element of the neighboring blocks. Because the conventional video encoder encodes the video blocks of the slice on a block by block basis, the conventional video encoder may not be capable of fully exploiting the correlation of the header information among the blocks of the slice. This is particularly true for the case when an entropy coder uses variable length coding. Using the header syntax element for block type as an example, even if a number of consecutive blocks have the same block type, conventional video encoders operating in VLC mode may send a 1-bit flag for each block to indicate that the block type is the same as the previous block. Thus, the conventional video encoder using VLC may encode at least one bit per block per syntax element to exploit the correlation of the header information among the blocks of the slice.

This disclosure describes techniques for generating a layered encoded bitstream structure. A video encoder configured to generate a layered encoded bitstream structure may be configured to group the header syntax elements of a number of blocks of a slice (or other coded unit) and encode the grouped header syntax elements together. The video encoder may run-length encode the grouped syntax elements to better exploit the correlation of the header information among the blocks of the slice, i.e., across block boundaries. For a number of blocks of the slice with the same block type, for example, the video encoder may encode the block type of the blocks of the slice as a run of N, where N is the number of consecutive blocks in the slice having the same block type, instead of encoding one bit per block as performed by the conventional video encoder.

The techniques of this disclosure may result in a reduction in the number of bits spent to encode block header information for a plurality of blocks, e.g., compared to conventional VLC techniques. In the example above, a video encoder using VLC may spend less than one bit per block to encode the block type, whereas a conventional video encoder using VLC would spend at least one bit per block to encode the same block type information. A video encoder that uses arithmetic coding may also utilize the layered encoded bitstream structure described in this disclosure. Using the layered encoded bitstream for both VLC and arithmetic coding may provide a more uniform bitstream structure between VLC and arithmetic coders. Additionally, the layered bitstream structure provides the opportunity for unequal error protection on the header layer and residual layer. For example, the header layer, which carries more important information, may be provided with better error protection than the residual layer.

FIG. 1 is a block diagram illustrating a video encoding and decoding system 10. As shown in FIG. 1, system 10 includes a source device 12 that transmits encoded video data to a receive device 14 via a communication channel 16. Communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting encoded video data from source device 12 to receive device 14.

Source device 12 generates coded video data for transmission to receive device 14. Source device 12 may include a video source 18, a video encoder 20 and a transmitter 22. Video source 18 of source device 12 may include a video capture device, such as a video camera, a video archive containing previously captured video, or a video feed from a video content provider. As a further alternative, video source 18 may generate computer graphics-based data as the source video, or a combination of live video and computer-generated video. In some cases, if video source 18 is a video camera, source device 12 may form a so-called camera phone or video phone. In each case, the captured, pre-captured or computer-generated video may be encoded by video encoder 20 for transmission from source device 12 to receive device 14 via transmitter 22 and communication channel 16.

Video encoder 20 receives video data from video source 18. The video data received from video source 18 may be a series of video frames. Video encoder 20 operates on blocks of pixels (or blocks of transform coefficients) within individual video frames in order to encode the video data. The video blocks may have fixed or varying sizes, and may differ in size according to a specified coding standard. In some cases, each video frame is a coded unit, while, in other cases, each video frame may be divided into a series of slices that form coded units. In other words, each slice may be a coded unit that includes only a portion of the video blocks of a frame. A video frame may be divided into slices in any of a variety of ways. For example, the video frame may be divided into slices based on spatial location of the blocks within the frame, with a first slice corresponding to blocks in a top one-third of the video frame, a second slice corresponding to blocks in a middle one-third of the video frame and a third slice corresponding to blocks in a bottom one-third of the video frame. As another example, a video frame may be broken into two slices where every other block belongs to the same slice. Such slice groupings are often referred to as a "checkerboard" slices. In yet another example, a slice may correspond to blocks within a location of the video frame identified as an object within the video frame. Other techniques for dividing a video frame into slices may also be used.

Each video block, often referred to as a macroblock (MB), may be arranged into sub-blocks. As an example, the International Telecommunication Union Standardization Sector (ITU-T) H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Smaller video blocks can provide better resolution, and may be used for locations of a video frame that include higher levels of detail. In general, MBs and the various sub-blocks may be considered to be video blocks. Thus, MBs may be considered to be video blocks, and if partitioned or sub-partitioned, MBs can themselves be considered to define sets of video blocks. In addition, a slice may be considered to be a set of video blocks, such as a set of MBs and/or sub-blocks. As noted, each slice may be an independently decodable unit of a video frame. If the video frame is the coded unit (rather than a slice), the video frame could also be considered to be a set of video blocks, such as a set of MBs and/or sub-blocks.

Following intra- or inter-based prediction of the video blocks, video encoder 20 may perform a number of other operations on the video blocks. As will be described in further detail with respect to FIG. 2, these additional operations may include transformation operations (such as 4×4 or 8×8 integer transform used in H.264/AVC or a discrete cosine transformation DCT), quantization operations, and entropy coding operations (such as variable length coding (VLC), binary arithmetic coding or another entropy coding technique).

Video encoder 20 encodes a plurality of video blocks of a coded unit (e.g., a slice or frame) in accordance with the techniques described in this disclosure to generate a layered encoded bitstream structure. Video encoder 20 separates header information of video blocks of the slice generated by video encoder 20 from the residual information (i.e., residual coefficients) of the video blocks of the slice generated by video encoder 20. Video encoder 20 may arrange the header syntax elements for the blocks into groups. In some cases, each of the groups includes a sequential arrangement of a particular syntax element of the blocks. For example, a group of block type syntax elements may include a block type syntax element of the first block of the slice, a block type syntax element of the second block of the slice, a block type syntax element of the third block of the slice and so on, in that order. Video encoder 20 may also generate similar groups for other header syntax elements, such as prediction mode, partition size, motion vector, coded block pattern, delta QP, transformation size and the like.

Video encoder 20 encodes each of the groups of header syntax elements using run-length coding. Run-length coding the groups of block header syntax elements allows video encoder 20 to exploit the correlation of the header syntax elements among the blocks of the slice. If the first three blocks of the slice have the same block type syntax element, for example, video encoder 20 may encode a run of length three to represent the block type of the three blocks instead of encoding the block type or a 1-bit flag separately in individual headers of each block. As a result, video encoder 20 may more efficiently encode block header information for a plurality of blocks. In some instances, video encoder 20 may use VLC to encode the header syntax elements with a coding efficiency similar to binary arithmetic coding.

After encoding each of the groups of header syntax elements, video encoder 20 encodes the residual information for each of the blocks of the slice. The encoded header information for the blocks of the slice may be viewed as one "layer" of the bitstream and the residual information may be viewed as another "layer" of the bitstream. In other words, video encoder 20 may encode a first sequence of bits that correspond with the encoded header information of the blocks of the slice, referred to herein as a "header layer," and encode a second sequence of bits that correspond with the encoded residual information of the blocks of the slice, referred to herein as a "residual layer." Thus, as used herein, the terms "header layer" and "residual layer" refer to different sequences of bits within the encoded layered bitstream.

In some instances, video encoder 20 may encode and transmit the header layer of the slice in the encoded layered bitstream structure before encoding and transmitting the corresponding residual layer of the slice. In other instances, however, video encoder 20 may encode and transmit the header layer of the slice in the encoded layered bitstream structure after encoding and transmitting the corresponding residual layer of the slice. In either case, video encoder 20 may additionally encode an identifier that indicates a location at which the encoded layered bitstream structure transitions from the header layer to the residual layer or from the residual layer to the header layer. Source device 12 transmits the encoded video data to receive device via transmitter 22.

Receive device 14 may include a receiver 24, video decoder 26, and display device 28. Receiver 24 receives the encoded layered bitstream of video data from source device 12 via channel 16. Video decoder 26 decodes the layered bitstream of video data to obtain the header information for the blocks of the slice and the residual information for the blocks of the slice. Video decoder 26 may identify the header layer and residual layer using the identifier within the layered bitstream that indicates the location of the transition from the header layer to the residual layer. Video decoder 26 associates header information (i.e., header syntax elements) with the residual information of each of the blocks of the slice. Video decoder 26 reconstructs the video blocks of the slice by generating a prediction block for each of the blocks using the header information and combining the prediction block with the corresponding residual information of the block. Receive device 14 may display the reconstructed video blocks to a user via display device 28. Display device 28 may comprise any of a variety of display devices such as a cathode ray tube (CRT), a liquid crystal display (LCD), a plasma display, a light emitting diode (LED) display, an organic LED display, or another type of display unit.

In some cases, source device 12 and receive device 14 may operate in a substantially symmetrical manner. For example, source device 12 and receive device 14 may each include video encoding and decoding components. Hence, system 10 may support one-way or two-way video transmission between video devices 12, 14, e.g., for video streaming, video broadcasting, or video telephony.

Video encoder 20 and video decoder 26 may operate according to a video compression standard, such as Moving Picture Experts Group (MPEG)-2, MPEG-4, ITU-T H.263, or ITU-T H.264/MPEG-4, Part 10, Advanced Video Coding (AVC). Although not shown in FIG. 1, in some aspects, video encoder 20 and video decoder 26 may each be integrated with an audio encoder and decoder, respectively, and may include appropriate MUX-DEMUX units, or other hardware and software, to handle encoding of both audio and video in a common data stream or separate data streams. In this manner, source device 12 and receive device 14 may operate on multimedia data. If applicable, MUX-DEMUX units may conform to the ITU H.223 multiplexer protocol, or other protocols such as the user datagram protocol (UDP).

The H.264/MPEG-4 AVC standard was formulated by the ITU-T Video Coding Experts Group (VCEG) together with the ISO/IEC MPEG as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

In some cases, video encoder 20 and video decoder 26 may be configured to support scalable video coding (SVC) for spatial, temporal and/or signal-to-noise ratio (SNR) scalability. Encoder 20 and decoder 26 may support various degrees of scalability by supporting encoding, transmission and decoding of a base layer and one or more scalable enhancement layers. For scalable video coding, a base layer carries video data with a baseline level of quality. One or more enhancement layers carry additional data to support higher spatial, temporal and/or SNR levels. The base layer may be transmitted in a manner that is more reliable than the transmission of enhancement layers. The base and enhancement layers are not separate sequences of bits within the same coded unit like the header layer and the residual data layer. Instead, the base and enhancement layers are encoded using hierarchical modulation on the physical layer such that the base layer and enhancement layer can be transmitted on the same carrier or subcarriers but with different transmission characteristics resulting in different packet error rate (PER).

In some aspects, for video broadcasting, the techniques described in this disclosure may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," published in July 2007 as Technical Standard TIA-1099 (the "FLO Specification"). That is to say, communication channel 16 may comprise a wireless information channel used to broadcast wireless video information according to the FLO Specification, or the like. The FLO Specification includes examples defining bitstream syntax and semantics and decoding processes suitable for the FLO Air Interface.

Alternatively, video may be broadcasted according to other standards such as DVB-H (digital video broadcast-handheld), ISDB-T (integrated services digital broadcast-terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple receive devices, each of which may be similar to receive device 14 of FIG. 1. Thus, although a single receive device 14 is shown in FIG. 1, for video broadcasting, source device 12 would typically broadcast the video content simultaneously to many receive devices.

In other examples, transmitter 22, communication channel 16, and receiver 24 may be configured for communication according to any wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM (Global System for Mobile Communication), GPRS (General packet Radio Service), or EDGE (enhanced data GSM environment), a TETRA (Terrestrial Trunked Radio) mobile telephone system, a wideband code division multiple access (WCDMA) system, a high data rate 1×EV-DO (First generation Evolution Data Only) or 1×EV-DO Gold Multicast system, an IEEE 802.18 system, a MediaFLO™ system, a DMB system, a DVB-H system, or another scheme for data communication between two or more devices.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 26 may be included in one or more encoders or decoders, either of which may be integrated as part of a combined encoder/decoder (CODEC) in a respective mobile device, subscriber device, broadcast device, server, or the like. In addition, source device 12 and receive device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being transmitter 22 of source device 12 and receiver 24 of receive device 14 in FIG. 1.

Figure 2:
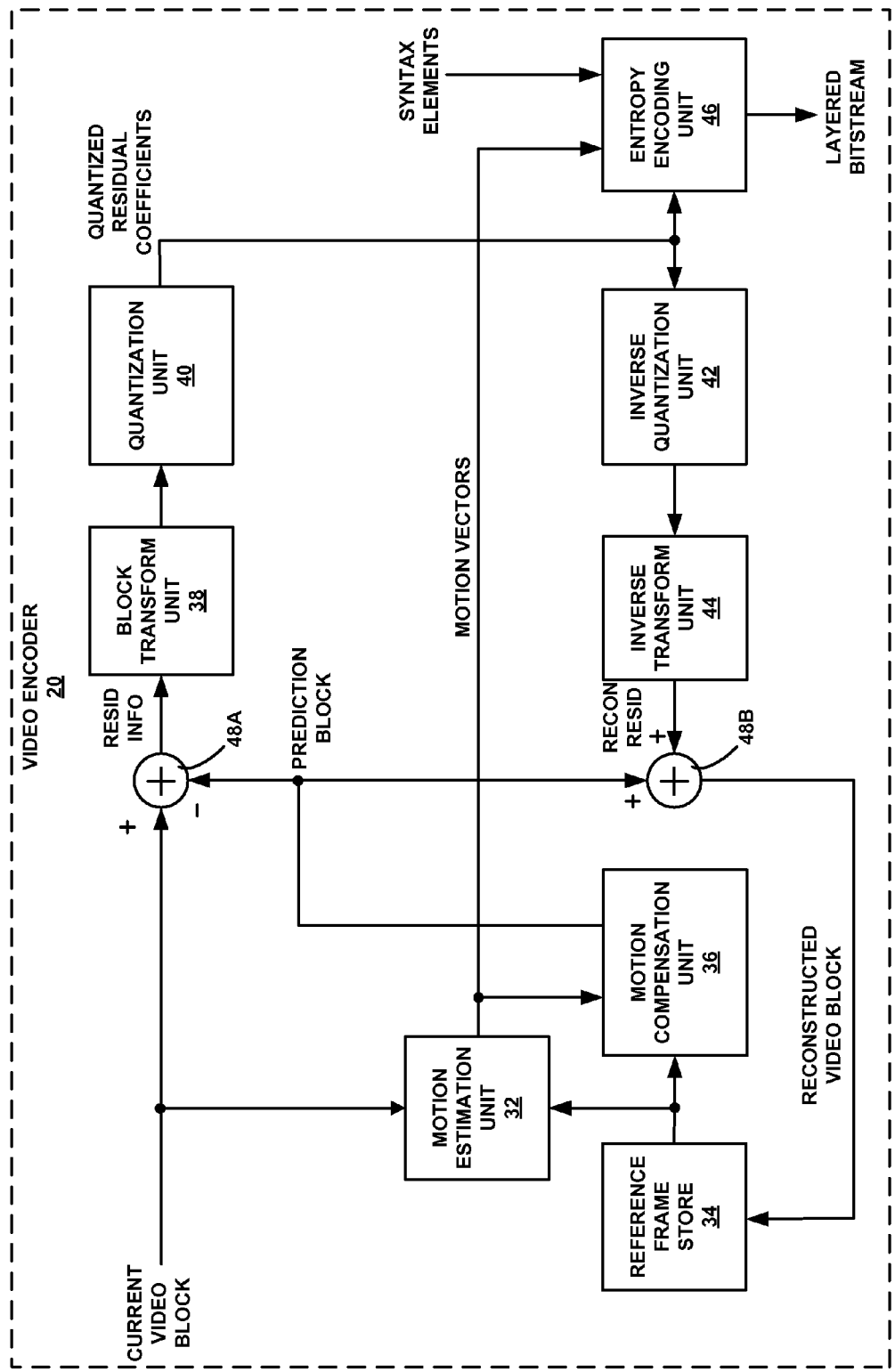
FIG. 2 is a block diagram illustrating an example of a video encoder.

FIG. 2 is a block diagram illustrating an example of a video encoder 20 that may correspond to that of source device 12 of FIG. 1. Video encoder 20 may perform intra- and inter-coding of blocks within video frames. Intra-coding relies on spatial prediction to reduce or remove spatial redundancy in video data within a given video frame. For intra-coding, video encoder 20 performs spatial prediction using already coded blocks within the same frame. Inter-coding relies on temporal prediction to reduce or remove temporal redundancy in video within adjacent frames of a video sequence. For inter-coding, video encoder 20 performs motion estimation to track the movement of matching video blocks between two or more adjacent frames.

As shown in FIG. 2, video encoder 20 receives a current video block within a video frame to be encoded. In the example of FIG. 2, video encoder 20 includes a motion estimation unit 32, reference frame store 34, motion compensation unit 36, block transform unit 38, quantization unit 40, inverse quantization unit 42, inverse transform unit 44 and entropy encoding unit 46. An in-loop deblocking filter (not shown) may be applied to reconstructed video blocks to remove blocking artifacts. Video encoder 20 also includes summers 48A and 48B ("summers 48"). FIG. 2 illustrates the temporal prediction components of video encoder 20 for inter-coding of video blocks. Although not shown in FIG. 2 for ease of illustration, video encoder 20 also may include spatial prediction components for intra-coding of some video blocks. The video block encoding techniques of this disclosure can apply with respect to video data of any blocks, such as blocks that are intra-coded or blocks that are inter-coded.

To perform temporal prediction, motion estimation unit 32 compares the current video block to blocks in one or more adjacent video frames to generate one or more motion vectors. The current video block refers to a video block currently being coded, and may comprise input to video encoder 20. The adjacent frame or frames (which include the video blocks to which the current video block is compared) may be retrieved from reference frame store 34. Reference frame store 34 which may comprise any type of memory or data storage device to store one or more previously encoded frames or blocks within the previously encoded frames. Motion estimation unit 32 identifies a block in an adjacent frame that provides the best prediction for the current video block, usually subject to a certain rate-distortion criterion. Motion estimation may be performed for blocks of variable sizes, e.g., 16 by 16, 16 by 8, 8 by 16, 8 by 8 or smaller block sizes.

Motion estimation unit 32 produces a motion vector (MV) (or multiple MV's in the case of bidirectional prediction) that indicates a magnitude and trajectory of the displacement between the current video block and the identified predictive block used to code the current video block. Motion vectors may have half- or quarter-pixel precision, or even finer precision, allowing video encoder 20 to track motion with higher precision than integer pixel locations and obtain a better prediction block. Using the resulting motion vector, motion compensation unit 36 forms a prediction video block by motion compensation. In the case of integer pixel precision, motion compensation unit 36 simply selects the block at the location identified by the motion vector as the prediction block. In the case of fractional pixel precision, motion compensation unit 36 may perform interpolation to form the prediction block.

Video encoder 20 generates residual information (labeled "RESID INFO" in FIG. 2) by subtracting the prediction video block produced by motion compensation unit 36 in the case of inter-coding from the current video block at summer 48A. As described above, the residual information quantifies the differences between the prediction video block and the current video block being coded. Block transform unit 38 applies a transform, such as a DCT or a 4×4 or 8×8 integer transform, to the residual information to produce residual transform coefficients. Quantization unit 40 quantizes the residual transform coefficients to further reduce the bit rate.

Following quantization, inverse quantization unit 42 and inverse transform unit 44 apply inverse quantization and inverse transformation, respectively, to reconstruct the residual information (labeled "RECON RESID" in FIG. 2). Summer 48A adds the reconstructed residual information to the prediction block produced by motion compensation unit 36 to produce a reconstructed video block for storage in reference frame store 34. The reconstructed video block may be used by motion estimation unit 32 and motion compensation unit 36 to encode a block in a subsequent video frame.

Entropy encoding unit 46 receives residual information in the form of quantized residual coefficients for the current video block from quantization unit 40. Additionally, entropy encoding unit 46 receives block header information for the current video block. The header information may include, for example, a number of header syntax elements that identify particular characteristics of the current video block. One such header syntax element for a block being inter-coded may be one or more motion vectors of the current video block received from motion estimation unit 32. Other header syntax elements of the current video block may include, for example, a block type (inter or intra), a prediction mode (prediction directionality for intra-coded blocks or forward/bi-directional prediction for inter-coded blocks), partition size (16 by 16, 8 by 8, etc.), a coded block pattern (luma and/or chroma CBP), a delta QP, transform size and the like. Other header syntax elements may be received from other components (not illustrated in FIG. 2) within video encoder 20.

In conventional video encoders, header syntax elements for each video block and corresponding residual information for each video block are encoded block by block. In other words, the conventional video encoder encodes header information of a first block followed by corresponding residual information of the first block, encodes header information of a second block followed by corresponding residual information for the second block, and so on until all the video blocks of the slice are encoded and transmitted. In this manner, the conventional video encoder may be viewed as generating a block by block encoded bitstream structure, as described in more detail with respect to FIG. 6A.

The header syntax elements for blocks of the slice may, however, be spatially correlated. In other words, at least a portion of the blocks of the slice may include similar header information, i.e., one or more of the same header syntax elements. In accordance with the techniques of this disclosure, entropy encoding unit 46 encodes header information of two or more blocks of the slice together as described in detail below. In particular, entropy encoding unit 46 separates header information of the video blocks of the slice from the residual information of the video blocks of the slice. Entropy encoding unit 46 arranges the header information of the blocks into groups based on the type of header syntax element. For example, entropy encoding unit 46 may group the block type syntax element of each block together into a first group, group prediction mode syntax element of each block together into a second group and so on for each of the types of syntax elements. Thus, each of the groups of syntax elements may include syntax elements of successive blocks. In one instance, such groups of syntax elements may be arranged sequentially such that the first group is sent before the second group, the second group is sent before the third group, and so on. In another instance, such groups of syntax elements may be arranged in an interleaved manner. Both types of header syntax element arrangements are described in detail below.

Following separation and arrangement of the header syntax elements, entropy encoding unit 46 encodes the header syntax elements of the groups using run-length coding to generate a header layer. Thus, the header layer includes header information of more than one block. Encoding the header information of more than one block allows entropy encoding unit 46 to reduce redundancy and better exploit the correlation of the header information across the plurality of blocks of the slice, especially when using VLC. Entropy encoding unit 46 additionally encodes the residual information of the blocks of the slice separately from the header information. In this manner, entropy encoding unit 26 does not sequentially encode the header information of each block followed by the residual information of the corresponding block. Instead, entropy encoding unit 46 encodes the blocks in a layered bitstream structure that includes a first sequence of bits, i.e., the header layer, that corresponds with the encoded header information of a plurality of video blocks of the slice and a second sequence of bits, i.e., the residual layer, that corresponds with the encoded residual information of the plurality of video blocks of the slice.

Entropy encoding unit 46 may additionally encode an indicator that identifies locations within the layered bitstream at which a transition from the header layer to the residual layer occurs. Entropy encoding unit 46 may encode a number of different types of indicators to identify the location of the layer separation in the encoded bitstream. For example, entropy encoding unit 46 may encode a unique bit pattern of a certain length to identify the location of such separation. As another example, entropy encoding unit 46 may encode a syntax element in the header layer that indicates a length, e.g., in bits, of the header layer.

Entropy encoding unit 46 waits for generation of header information and residual information for the blocks of the slice before entropy coding the slice. Video encoder 20 may therefore experience some delay while waiting for generation of the header and residual information for the blocks of the slice. This may not be suitable for some applications, such as applications that require real-time encoding and/or when video encoder 20 has limited memory resources. For other applications, however, such as applications where real-time encoding is not required (e.g., video streaming and video broadcasting) or when video encoder 20 has plentiful memory resources, the layered bitstream arrangement provides the benefits of a coherent bitstream structure and high coding efficiency.

Encoding the blocks of the slice in the layered bitstream structure allows entropy encoding unit 46 to improve coding efficiency and better exploit the correlation of the header information of the blocks of the slice when configured to use VLC. Entropy encoding unit 46 may also utilize the layered encoded bitstream structure described in this disclosure when configured to use arithmetic coding. Using the layered encoded bitstream for both VLC and arithmetic coding may provide a more uniform bitstream structure between VLC and arithmetic coders. Additionally, the layered bitstream structure provides the opportunity for unequal error protection on the header layer and residual layer. For example, the header layer, which carries more important information, may be provided with better error protection than the residual layer.

In some instances, entropy coding unit 46 may use the layered bitstream structure described in this disclosure in conjunction with a block by block bitstream structure. In other words, entropy coding unit 46 may encode some coded units in the form of the layered bitstream structure and encode other coded units in the form of the block by block bitstream structure. For example, in a scalable video bitstream which includes one base layer bitstream and one or more enhancement layer bitstreams, the base layer bitstream may be coded in the form of block by block bitstream structure while the enhancement layer may be coded in the form of layered bitstream structure. Such an arrangement provides the benefits of backward compatibility for base layer bitstream (such as an existing H.264/AVC decoder can decode the base layer) and higher coding efficiency for enhancement layer. In this case, entropy encoding unit 46 may include a flag within a coded unit header (e.g., a slice header or picture- or sequence-level header) to indicate a type of bitstream structure, i.e., whether the bitstream is arranged in a layered structure or a block by block structure. In this manner, entropy coding unit 46 may utilize both layered encoded bitstream structures and block by block encoded bitstream structures, e.g., by dynamically switching between the structures.

Although the layered encoding techniques described in this disclosure are described with reference to encoding blocks of a slice of a frame, the techniques may be used in encoding other coded units in a layered bitstream structure. For example, video encoder 20 may encode coded units that are larger than a slice, such as more than one slice, an entire frame or an entire sequence, in a layered bitstream structure. Additionally the techniques of this disclosure may be used to encode coded units using VLC or arithmetic coding.

Figure 3:
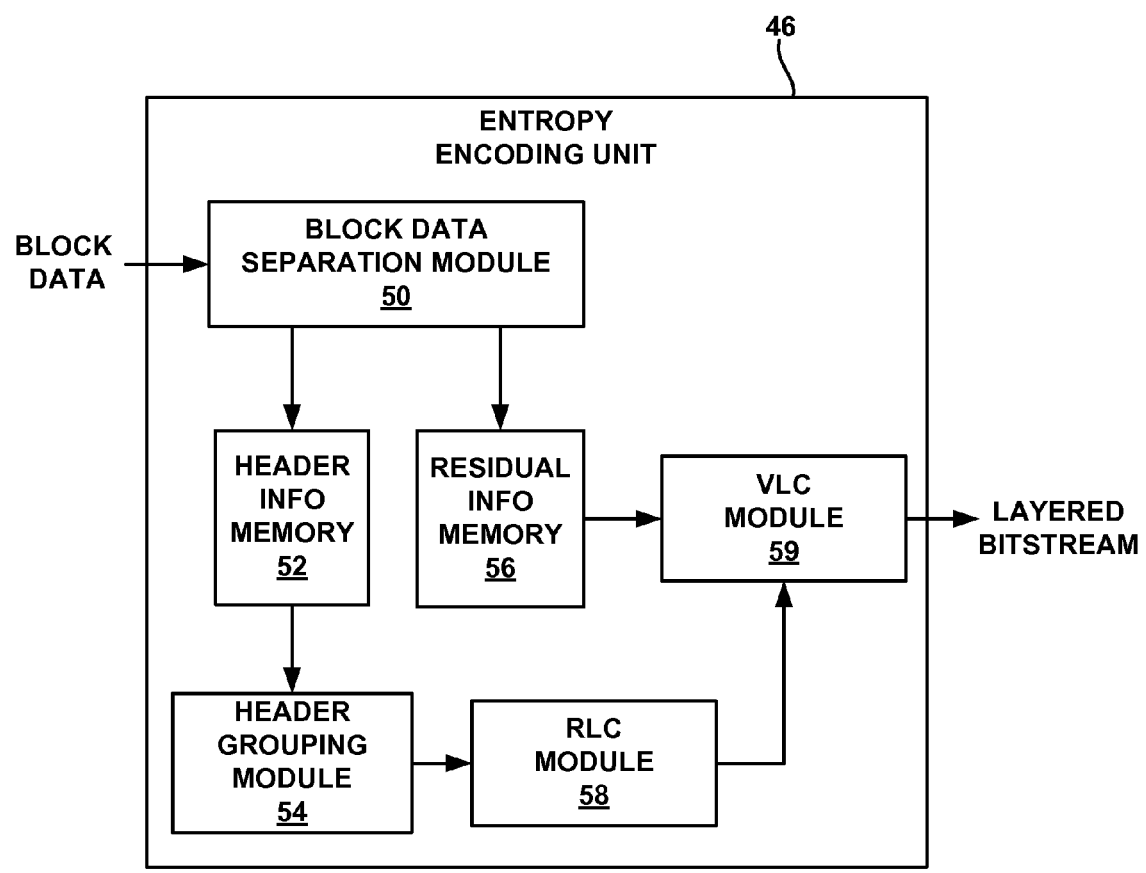
FIG. 3 is a block diagram of an entropy encoding unit configured to generate a layered encoded bitstream in accordance with an aspect of the disclosure.

FIG. 3 is a block diagram of an entropy encoding unit 46 configured to generate a layered encoded bitstream in accordance with an aspect of the disclosure. Entropy encoding unit 46 may reside within video encoder 20 of FIGS. 1 and 2. Entropy encoding unit 46 receives block data for a plurality of blocks and generates a layered encoded bitstream for transmission to another device for decoding. In the example of FIG. 3, entropy encoding unit 46 includes a block data separation module 50, a header information memory 52, a residual information memory 54, a run-length coding (RLC) module 58 and a variable-length coding (VLC) module 59.

In operation, block data separation module 50 receives block data for video blocks of a slice. Block data separation module 50 may receive the block data for the video blocks of the slice as the block data is generated by other components of video encoder 20, e.g., quantization unit 20, motion estimation unit 32, and the like. The block data received for each block may include residual information (e.g., in the form of quantized residual transform coefficients) and header information (e.g., in the form of one or more header syntax elements, such as one or more motion vectors, a block type, a prediction mode, a partition size, a coded block pattern, a delta QP, transform size and the like).

Block data separation module 50 separates the residual information of each block from the header information of the block. Block data separation module 50 may, for example, store the residual information of each block in residual information memory 56 and store the header information of each block in header information memory 52. Block separation module 50 continues to receive block data for video blocks of the slice, separate the header information from the residual information, and store the separated information in respective memories 52, 56.

After receiving and separating the block data of each of the blocks of the slice, header grouping module 54 groups the header information of the blocks of the slice to exploit the correlation of the header information among the blocks of the slice using run-length coding. Header grouping module 54 may group the same header syntax elements of each of the blocks into the same group. As an example, assume the slice includes five blocks with header information that includes a block type syntax element and a delta QP syntax element, with the first block having a block type equal to zero and a delta QP equal to zero, the second block having a block type equal to zero and a delta QP equal to zero, the third block having a block type equal to one and a delta QP equal to zero, the fourth block having a block type equal to one and a delta QP equal to zero, and the fifth block having a block type equal to zero and a delta QP equal to one. In this example, header grouping module 54 groups the header syntax elements of the blocks into two groups: one group of block type syntax elements and one group of delta QP syntax elements.

RLC module 58 encodes runs of each of the groups of header syntax elements to reduce the redundancy and exploit the correlation of the header syntax elements among the blocks of the slice. In one instance, RLC module 58 may encode each of the groups of header syntax elements sequentially. Thus, RLC module 58 sequentially encodes runs of a first header syntax element of the blocks before runs of a second syntax element of the blocks and so on until RLC module 58 encodes runs for the last syntax element of the blocks. In the example above, RLC module 58 sequentially encode runs of the block type syntax element of the five blocks before runs of the delta QP syntax element of the five blocks. In particular, RLC module 58 sequentially encodes a first block type run of $\{0, 2\}$, followed by a second block type run of $\{1, 2\}$, followed by a third block type run of $\{0, 1\}$, followed by a first delta QP run of $\{0, 4\}$, followed by a second delta QP run of $\{1, 1\}$.

Alternatively, RLC module 58 encodes header information of the blocks of the slice such that runs of the header syntax elements are interleaved among one another. For example, RLC module 58 may encode at least one run for each syntax element prior to encoding additional runs of any of the syntax elements. In this case, with reference to the above example of a five block slice with block type and delta QP syntax elements, RLC module 58 encodes a first block type run of $\{0, 2\}$, followed by a first delta QP run of $\{0, 4\}$, followed by a second block type run of $\{1, 2\}$, followed by a third block type run of $\{0, 1\}$, followed by a second delta QP run of $\{1, 1\}$. In this manner, RLC module 58 interleaves encoded runs of syntax elements in locations where the syntax elements are needed for decoding the current block, thereby reducing the complexity of associating the header syntax elements and the residual information at the decoder. For example, RLC module 58 encodes the second block type run before the second delta QP run because the first block type run is shorter than the first delta QP run. If the first delta QP run was shorter than the first block type run, the second delta QP run may be encoded before the second block type run. In this manner, RLC module 58 encodes additional runs of syntax elements, if there are additional runs to encode, when the previous run of the same syntax element has been exhausted (i.e., ends). In some instances, entropy coding unit 46 may encode a flag indicating whether the header layer is arranged in a sequential manner or an interleaved manner.

Following generation of the runs of syntax elements of the blocks of the slice, VLC module 59 encodes the runs of the syntax elements to generate the header layer of the layered bitstream. VLC module 59 additionally encodes the residual information of each of the plurality of blocks separately from the header information to generate a residual layer of the layered bitstream. In this manner, VLC module 59 encodes the layered bitstream to include a first sequence of bits that corresponds with the header information of the plurality of video blocks and a second sequence of bits that corresponds with the residual information of the plurality of video blocks. VLC module 59 may encode the runs of the syntax elements of the header information and the residual information using one or more variable length coding tables.

VLC module 59 may additionally generate an indicator that identifies the location of a transition from the header layer to the residual layer for a particular slice. In one instance, VLC module 59 may encode a unique pattern of bits that indicates the end of the header layer. Alternatively, VLC module 59 may encode a syntax element at the beginning of the header layer that indicates a length, e.g., in bits, of the header layer. Moreover, in cases in which entropy encoding unit 46 may generate both layered bitstream structures and block by block bitstream structures, VLC module 59 may set a flag within a slice header to indicate a type of bitstream structure, i.e., whether the bitstream is arranged in a layered structure or a block by block structure.

Although entropy encoding unit 46 of FIG. 3 is described as performing VLC, the techniques may be used for arithmetic coding. For example, entropy encoding unit 46 may include an arithmetic coding module instead of VLC module 59. The runs of the syntax elements may be arithmetic coded to generate the header layer of the layered bitstream and the residual information may be separately arithmetic coded to generate the residual layer of the layered bitstream. Alternatively, entropy encoding unit 46 may use a combination of VLC and arithmetic coding to encode the header information and the residual information. For example, the runs of the header syntax elements may be encoded using VLC and the residual information may be encoded using arithmetic coding or vice versa.

Figure 4:
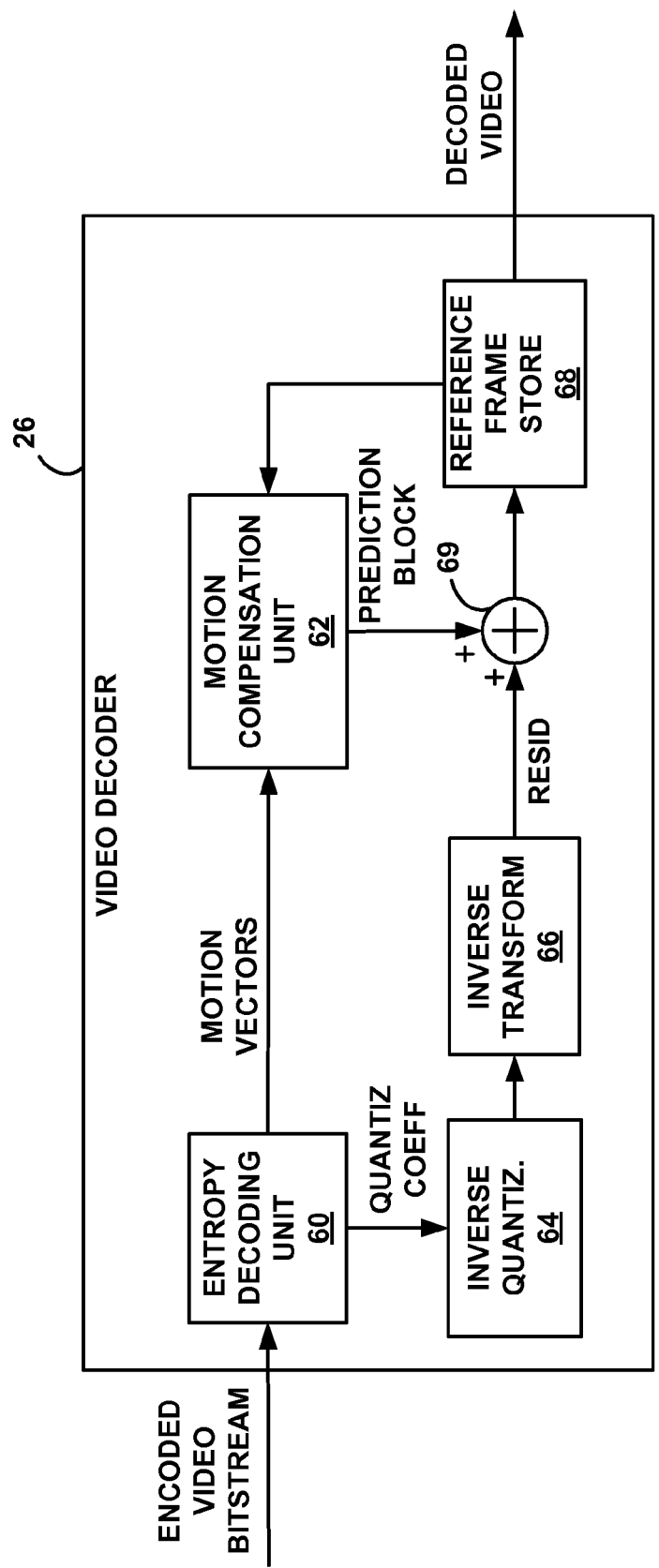
FIG. 4 is a block diagram illustrating an example of a video decoder.

FIG. 4 is a block diagram illustrating an example of a video decoder 26, which may correspond to that of FIG. 1. Video decoder 26 may perform intra- and inter-decoding of blocks within video frames. In the example of FIG. 4, video decoder 26 includes an entropy decoding unit 60, motion compensation unit 62, inverse quantization unit 64, inverse transform unit 66, and reference frame store 68. Video decoder 26 also includes summer 69, which combines the outputs of inverse transform unit 66 and motion compensation unit 62. FIG. 4 illustrates the temporal prediction components of video decoder 26 for inter-decoding of video blocks. Although not shown in FIG. 4, video decoder 26 also includes spatial prediction components, e.g., a spatial prediction module, for intra-decoding of some video blocks.

Entropy decoding unit 60 receives the encoded video bitstream and applies variable length decoding techniques, e.g., using one or more variable length coding tables, to decode the bitstream. As described in detail above, the encoded video bitstream may be arranged as a layered bitstream structure to more efficiently exploit correlation of the header information among blocks of a slice. For example, the received bitstream may include a first sequence of bits, i.e., header layer, that corresponds with the header information of the plurality of blocks and a second sequence of bits, i.e., residual layer, that corresponds with the residual information of the plurality of blocks. Entropy decoding unit 60 performs decoding in an inverse manner relative to entropy encoding unit 46 of FIG. 2 in order to retrieve the residual information and the header information of the block of the slice.

To determine which sequence of bits corresponds to the header information and which sequence of bits corresponds to the residual information, entropy decoding unit 60 detects an indicator within the layered bitstream that identifies the location at which a transition between the header layer and the residual layer occurs. For example, entropy decoding unit 60 may detect a unique bit pattern that indicates that the encoded bitstream is transitioning from the header layer to the residual layer. As another example, entropy decoding unit 60 may detect a header syntax element that indicates a length, e.g., in bits, of the header layer. Entropy decoding unit 60 may, however, detect a number of other indicators to identify the transition from the header layer to the residual layer.

Entropy decoding unit 60 decodes the header and residual layers and stores the decoded header syntax elements and residual information. Entropy decoding unit 60 associates the residual information for each block with the corresponding header syntax elements of the block. Entropy decoding unit 60 may rearrange the decoded header syntax elements to group the syntax elements that belong to the same block. In this manner, entropy decoding unit 60 rearranges the block data into block by block order. In the case of a sequential layered bitstream, for example, entropy decoding unit 60 may decode and store the header information, decode and store the residual information, assemble the header and residual information for each block and provide such information to the other components of the decoding unit. In the case of an interleaved layered bitstream, however, entropy decoding unit 60 may begin reconstructing some of the blocks of the slice prior to fully decoding the entire header layer and residual layer as described in detail below.

Video decoder 26 reconstructs the frames of video block by block using the header syntax elements and the residual information. The header syntax elements may be used by video decoder 26 to configure one or more components. For example, entropy decoding unit 60 may provide motion vectors and partition sizes to motion compensation unit 62, QP values to use during inverse quantization to inverse quantization unit 64 or the like. The components of video decoder 26 generate a prediction block and a residual block, and combine the residual block with the prediction block to reconstruct of the video block.

For each inter-coded block, motion compensation unit 62 receives one or more motion vectors and partition sizes from entropy decoding unit 60 and one or more reconstructed reference frames from reference frame store 68 and generates a prediction block, i.e., a motion compensated block. Inverse quantization unit 64 inverse quantizes, i.e., de-quantizes, the quantized residual coefficients in accordance with the QP syntax element. Inverse transform unit 66 applies an inverse transform, e.g., an inverse DCT or inverse 4×4 or 8×8 integer transform, to the de-quantized residual coefficients to produce residual block. Summer 69 sums the prediction block generated by motion compensation unit 62 with the residual block from inverse transform unit 66 to form a decoded block.

Block-based video encoding can sometimes result in visually perceivable blockiness at block boundaries of a coded video frame. In such cases, deblock filtering may smooth the block boundaries to reduce or eliminate the visually perceivable blockiness. As such, a deblocking filter (not shown) may also be applied to filter the decoded blocks in order to remove blockiness artifacts. Following any optional deblock filtering, the reconstructed blocks are then placed in reference frame store 68, which provides reference blocks for motion compensation and also produces decoded video to drive display device (such as device 28 of FIG. 1).

Figure 5:
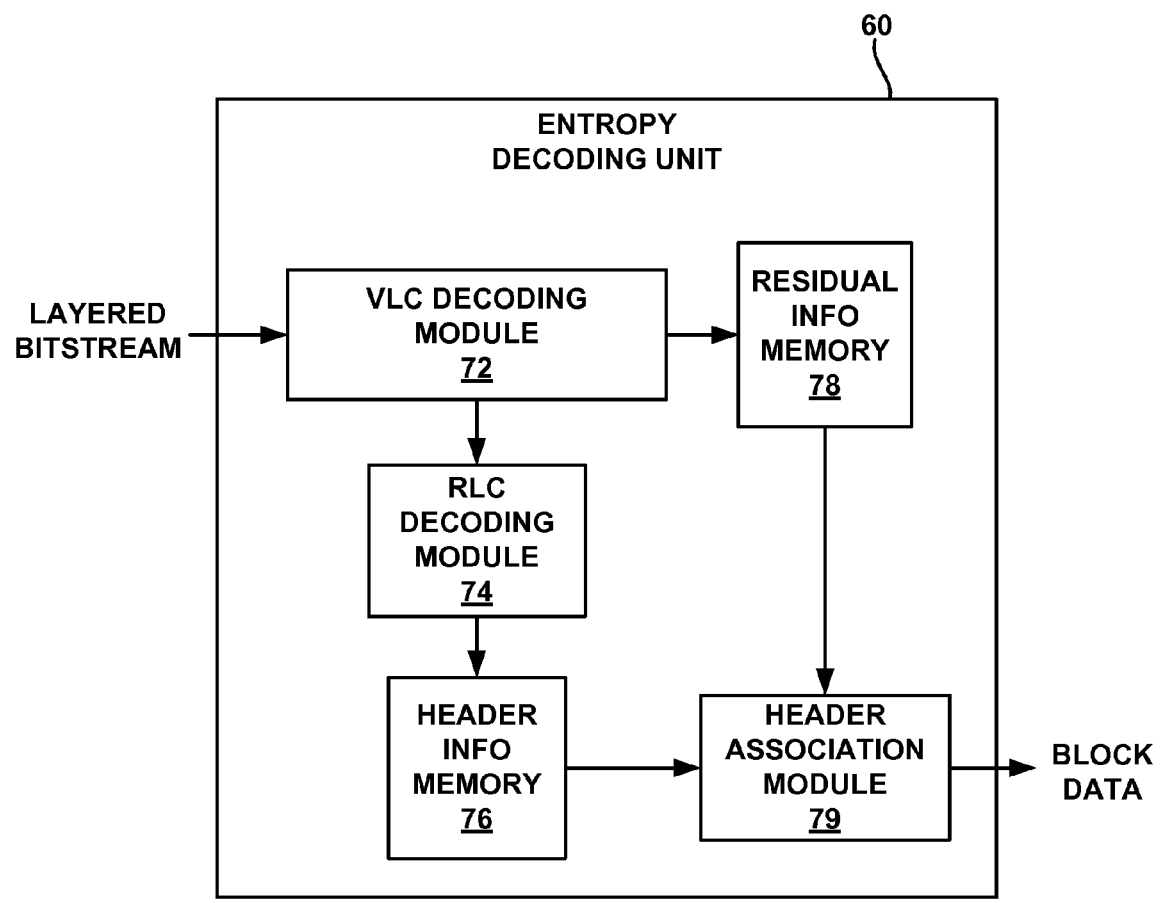
FIG. 5 is a block diagram illustrating an example entropy decoding unit configured to decode a layered encoded bitstream in accordance with an aspect of this disclosure.

FIG. 5 is a block diagram illustrating an example entropy decoding unit 60 configured to decode a layered encoded bitstream in accordance with an aspect of this disclosure. Entropy decoding unit 60 may reside within video decoder 26 of FIGS. 1 and 4. Entropy decoding unit 60 receives a layered encoded video bitstream of a slice and generates block data for the blocks of the slice for use in reconstructing video data.

In the example of FIG. 5, entropy decoding unit 60 includes a VLC decoding module 72, RLC decoding module 74, header information memory 76, residual information memory 78, and header association module 79.

VLC decoding module 72 decodes the layered bitstream of the slice. As described above, video encoder 20 encodes the slice using a layered bitstream structure, which includes a first sequence of bits that corresponds with the encoded header information of the blocks (i.e., the header layer) and a second sequence of bits that corresponds with the encoded residual information of the blocks (i.e., the residual layer). The location of a transition from the header layer and the residual layer may be identified within the layered bitstream using one or more indicators.

VLC decoding module 72 applies variable length decoding techniques, e.g., using one or more variable length coding tables, to decode header layer and the residual layer. VLC decoding module 72 may, for example, use one set of coding tables to decode the header layer and another set of coding tables to decode the residual layer. Upon detecting the transition from the header layer to the residual layer, VLC decoding module 72 may select a different set of coding tables. The decoded header information and residual information may be stored within header information memory 74 and residual information memory 78, respectively.

After performing variable length decoding of the header layer, RLC decoding module 74 run-length decodes the header layer to obtain the header information for the blocks of the slice. The decoded header information includes a number of syntax elements that are grouped based on the types of syntax elements. In one example, the syntax elements may be grouped such that syntax elements of a first type (e.g., block type) for all the blocks of the slice are grouped together, syntax elements of a second type (e.g., prediction mode) for all blocks of the slice are grouped together and so on. In this manner, the decoded header information is arranged sequentially so that all syntax elements of a first type precede all syntax elements of a second type and all syntax elements of the second type precede all syntax elements of a third type and so on.

Alternatively, the syntax elements of the header information may be interleaved among one another. For example, a first subset of the syntax elements of the first type may be followed by a first subset of syntax elements of the second type, the first subset of syntax elements of the second type may be followed by a first subset of syntax elements of a third type, the first subset of syntax elements of the third type may be followed by a second subset of syntax elements of the first type and so on. In this manner, runs of the header syntax elements are interleaved among one another. Entropy decoding unit 60 may identify a flag that indicates whether the syntax elements of the header layer are arranged in a sequential manner or an interleaved manner.

Header association module 79 associates the residual information of each block of the slice with the header syntax elements of the block. For example, header association module 79 may associate residual information of a first block of a slice with the first value of each of the header syntax elements of the decoded header layer, associate residual information of a second block of the slice with the second values of each of the header syntax elements, and so on until residual information of each of the blocks of the slice is associated with corresponding header syntax elements.

As header association module 79 associates the residual information of a block with the corresponding header syntax elements, header association module 79 outputs the block data of that block to other components of the video decoder for reconstruction of the block. In some instances, header association module 79 may output portions of the block data to different components of the video decoder as described above in FIG. 4. In this manner, header association module 79 reorganizes the block data of the slice into a block by block structure for reconstruction of the video data.

Although entropy decoding unit 60 of FIG. 5 is described as performing VLC decoding, the techniques may likewise be used for arithmetic coding. For example, entropy decoding unit 60 may include an arithmetic decoding module instead of VLC decoding module 72. The header layer of the layered bitstream may be arithmetic decoded to generate the runs of the header syntax elements and the residual layer of the layered bitstream may be separately arithmetic decoded to generate the residual information. Alternatively, entropy decoding unit 60 may use a combination of VLC and arithmetic decoding to decode the header information and the residual information.

Figure 6:
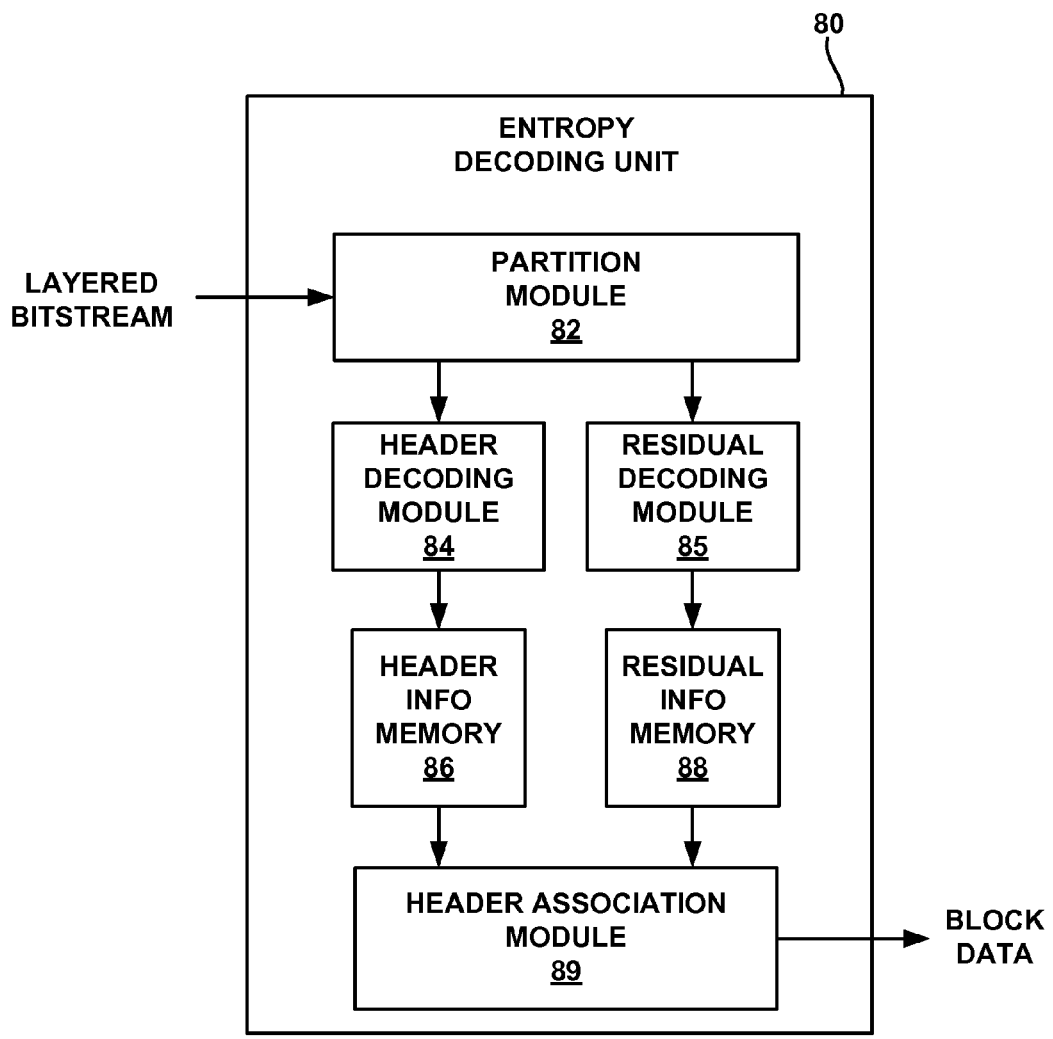
FIG. 6 is a block diagram illustrating another example entropy decoding unit configured to decode an interleaved layered encoded bitstream in accordance with an aspect of this disclosure.

FIG. 6 is a block diagram illustrating another example entropy decoding unit 80 configured to decode a layered encoded bitstream in accordance with an aspect of this disclosure. Entropy decoding unit 80 may reside within video decoder 26 of FIGS. 1 and 4. Entropy decoding unit 80 receives an interleaved layered encoded video bitstream of a slice and generates block data for the blocks of the slice for use in reconstructing video data. In the example of FIG. 6, entropy decoding unit 80 includes a partition module 82, header decoding module 84, a residual decoding module 85, header information memory 86, residual information memory 88, and header association module 89.

Partition module 82 receives a layered bitstream of the slice and separates the layered bitstream into a header layer and a residual layer. As described above, video encoder 20 may encode the slice with an indicator that identifies a location of a transition from the header layer to the residual layer, e.g., a unique sequence of bits at the end of the header layer or a header syntax element indicating the length of the header layer. Partition module 82 identifies the location of the transition based on the indicator and separates the header layer from the residual layer. Partition module 82 provides header decoding module 84 with the encoded header layer and provides residual decoding module 85 with the encoded residual layer.

Entropy decoding unit 80 may perform synchronized block-by-block decoding of the blocks of the slice. Header decoding module 84 decodes the header layer to obtain the header information, e.g., in the form of one or more syntax elements, and stores the header syntax elements in header information memory 86. Header decoding module 84 may use VLC or arithmetic decoding techniques to obtain the runs of header syntax elements, and run-length decode the runs to obtain the header syntax elements. The interleaved layered bitstream is arranged with runs of different header syntax elements interleaved among one another. Subsequent runs of a syntax element occur when the previous run of the same syntax element ends. In this manner, encoded runs of syntax elements are placed at locations where the syntax elements are needed for decoding the current block, thereby reducing the complexity of associating the header syntax elements and the residual information at the decoder. Thus, header decoding module 84 may decode the runs to obtain the header syntax elements for a first block of the slice without decoding all the runs of header syntax elements.

Residual decoding module 85 decodes the residual layer to obtain residual information, e.g., in the form of transform coefficients, and stores the residual coefficients in residual information memory 88. Residual decoding module 85 may decode the residual layer using VLC or arithmetic coding techniques to obtain the transform coefficients. Residual decoding module 85 and header decoding module 84 may decode the residual layer and the header layer concurrently.

Header association module 89 associates the residual information of each block of the slice with the header syntax elements of the block. For example, header association module 89 may generate block data for a first block of the slice as soon as the residual information and the header information of the first block are decoded. In particular, header association module 89 associates residual information of the first block of the slice with the values of each of the first runs of header syntax elements of the decoded header layer. Thus, the other components in the video decoder 26 may begin to reconstruct the first block of the slice before the remainder of the header information and residual information is decoded. Header association module 89 continues to associate residual information with corresponding header syntax elements as the information is decoded. In this manner, the interleaved arrangement of the header layer allows the video decoder 26 to perform synchronized block-by-block decoding of the blocks of the slice with a reduced amount of delay and a reduced amount of memory required to store the header information and the residual information.

FIGS. 7A-7C illustrate example bitstream structures. FIG. 7A illustrates an example block by block bitstream structure 90 and FIGS. 7B and 7C illustrate example layered bitstream structures 92A and 92B, respectively. Block by block bitstream structure 90 is arranged such that header information and corresponding residual information of each block are encoded sequentially. In particular, block by block bitstream structure is arranged such that encoded header information 94A of a first block (labeled "MB 1" in FIG. 7A) is followed by corresponding encoded residual information 96A of block MB 1, encoded header information 94B of a second block (labeled "MB 2" in FIG. 7A) is followed by corresponding encoded residual information 96B for second block MB 2 and so on until the last block (labeled "MB n" in FIG. 7A).

As further illustrated in FIG. 7A, header information 94A of block MB 1 includes header syntax elements $98A_1$-$98K_1$ (collectively, "header syntax elements 98"). Header syntax elements 98 may include a block type (inter or intra), a prediction mode (prediction directionality for intra-coded blocks or forward/backward/bi-directional prediction for inter-coded blocks), a partition size (16 by 16, 8 by 8, etc.), a motion vector, a coded block pattern (CBP), a delta QP, a transform size and the like. In other words, each of header syntax elements 98 may correspond with a different syntax element. As an example, syntax element $98A_1$ may correspond to a block type syntax element, syntax element $98B_1$ may correspond to a prediction mode syntax element, syntax element $98C_1$ may correspond to a partition size syntax element and block type syntax element $98K_1$ may correspond to a CBP syntax element. Header information 94A may, however, include more or fewer syntax elements 98. Encoded header information 94 of the other blocks of the bitstream 90 may also include header syntax elements. For example, encoded header information 94B of block MB 2 may include header syntax elements $98A_2$-$98K_2$ (not shown in FIG. 7A) and encoded header information 94N of block MB n may include header syntax elements $98A_n$-$98K_n$ (not shown in FIG. 7A). Thus, in the block by block bitstream structure the header syntax elements and the corresponding residual information are encoded sequentially for each block.

As described above, blocks MB 1 through MB n may have the same value for one or more of the same header syntax elements. For example, a first portion of the blocks may have a same value of the block type syntax element and a second portion of the blocks may have a same value of the delta QP syntax element. Because block by block bitstream 90 is arranged on a block by block basis, i.e., sequentially encoded header information 94 of the block is followed by corresponding residual information 96 of the same block, block by block bitstream 90 may not be capable of fully exploiting the correlation of header information among the blocks. Using the header syntax element for block type as an example, even if a number of consecutive blocks have the same block type, if the entropy coder uses VLC coding and predicts the current block type from the preceding block type, at least a 1-bit flag is included within encoded header information 94 of each block to represent the block type syntax element. For example, the 1-bit flag being 1 indicates that the current block type is the same as the preceding block type; on the other hand, the 1-bit flag being 0 indicates that the current block type is different from the preceding block type, in which case the current block type needs to be coded as well. Thus, at least one bit per block per syntax element 98 is sent to exploit the correlation of the header information among the blocks.

FIG. 7B illustrates a sequential layered bitstream structure 92A that includes a header layer and a residual layer in accordance with an aspect of this disclosure. The header layer includes encoded header information of all the blocks encoded together to reduce redundancy and better exploit the correlation of the header information across the blocks. As illustrated in FIG. 7B the header layer includes encoded syntax element runs 99A-99K (collectively, "SE runs 99") that are arranged sequentially. Encoded header syntax element run 99A includes run-length coded header syntax elements of the same type for all of the blocks. In particular, encoded header SE run 99A includes one or more encoded runs for header syntax element $98A_n$ of block MB 1, $98A_2$ of block MB 2 and so on through syntax element $98B_n$ of block MB n, encoded header SE run 99B includes one or more runs for header syntax element $98B_1$ of block MB 1, $98B_2$ of block MB 2 and so on through syntax element $98B_n$ of block MB n, and so on. Thus, sequential layered bitstream structure 92A includes SE runs 99 of each of the types of header syntax elements arranged sequentially. The residual layer includes encoded residual data for each of the blocks.

FIG. 7C illustrates an interleaved layered bitstream structure 92B that includes a header layer and a residual layer. The header layer of interleaved layered bitstream structure 92B includes encoded header information in which SE runs 99 of different header syntax elements are interleaved within the header layer. This is referred to as the interleaved arrangement of the header layer. As illustrated in FIG. 7C, the header layer includes SE run $99A_1$, SE run $99B_1$ through SE run $99K_1$, followed by SE run $99X_2$, and so on. SE run $99A_1$ is an encoded run for the first run of syntax element 98A. Syntax element 98A refers to the group that includes syntax element $98A_1$, $98A_2$, ... $98A_n$. In other words, syntax elements $98A_1$, $98A_2$, ... $98A_n$ are collectively referred to as syntax element 98A. Likewise, SE run $99B_1$ through SE run $99K_1$ are encoded runs for the first runs of syntax elements 98B through 98K, respectively. Syntax element 98B and 98K refer to the collective groups that includes syntax element $98B_1$, $98B_2$, ... $98B_n$ and $98K_1$, $98K_2$, ... $98K_n$, respectively. SE run $99X_2$ is an encoded run for the second run of the syntax element with the shortest first run. For example, if the first run $99B_1$ of syntax element 98B is the shortest first run, then SE run $99X_2$ is a second run of syntax element 98B. If, however, the first run $99K_1$ of syntax element 98K is the shortest syntax element, then SE run $99X_2$ is a second run of syntax element 98K. Thus, the header layer may include at least one encoded SE run 99 for each syntax element prior to any second encoded runs of any of the other syntax elements 98. This allows a decoder to begin reconstructing blocks of a slice prior to fully decoding the entire header layer and residual layer as described in detail below.

In this manner, interleaved layered bitstream structure 92B may be arranged with SE runs 99 of different header syntax elements interleaved within the header layer such that when a run of one of the syntax element is exhausted (i.e., ends), the next run for the same syntax element is encoded (if there is one). As such, the interleaved layered bitstream structure 92B is arranged dynamically based on the values of each of the runs instead of being a fixed structure. Although the interleaved layered bitstream structure 92B of FIG. 7C is shown as including only one second run, interleaved layered bitstream structure 92B may include second runs for all or any portion of the syntax elements. Additionally, header syntax elements may include additional runs (e.g., third runs, fourth runs, fifth runs, and so on) for all or any portion of the header syntax elements. The additional runs of header syntax elements are encoded in an interleaved manner at locations in which the previous run of the header syntax element ends. As such, a third run of a header syntax element may occur before a second run of a different header syntax element and so on depending on the length of the runs of the header syntax elements.

Sequential layered bitstream structure 92A and interleaved layered bitstream structure 92B also include an indicator 97 that identifies a location at which a transition from the header layer and the residual layer occurs. Although in the example illustrated in FIGS. 7B and 7C the indicator 97 is located at the transition, in other instances the indicator 97 may be a header syntax element at the beginning of the header layer that indicates a length of the header layer.

Figure 8:
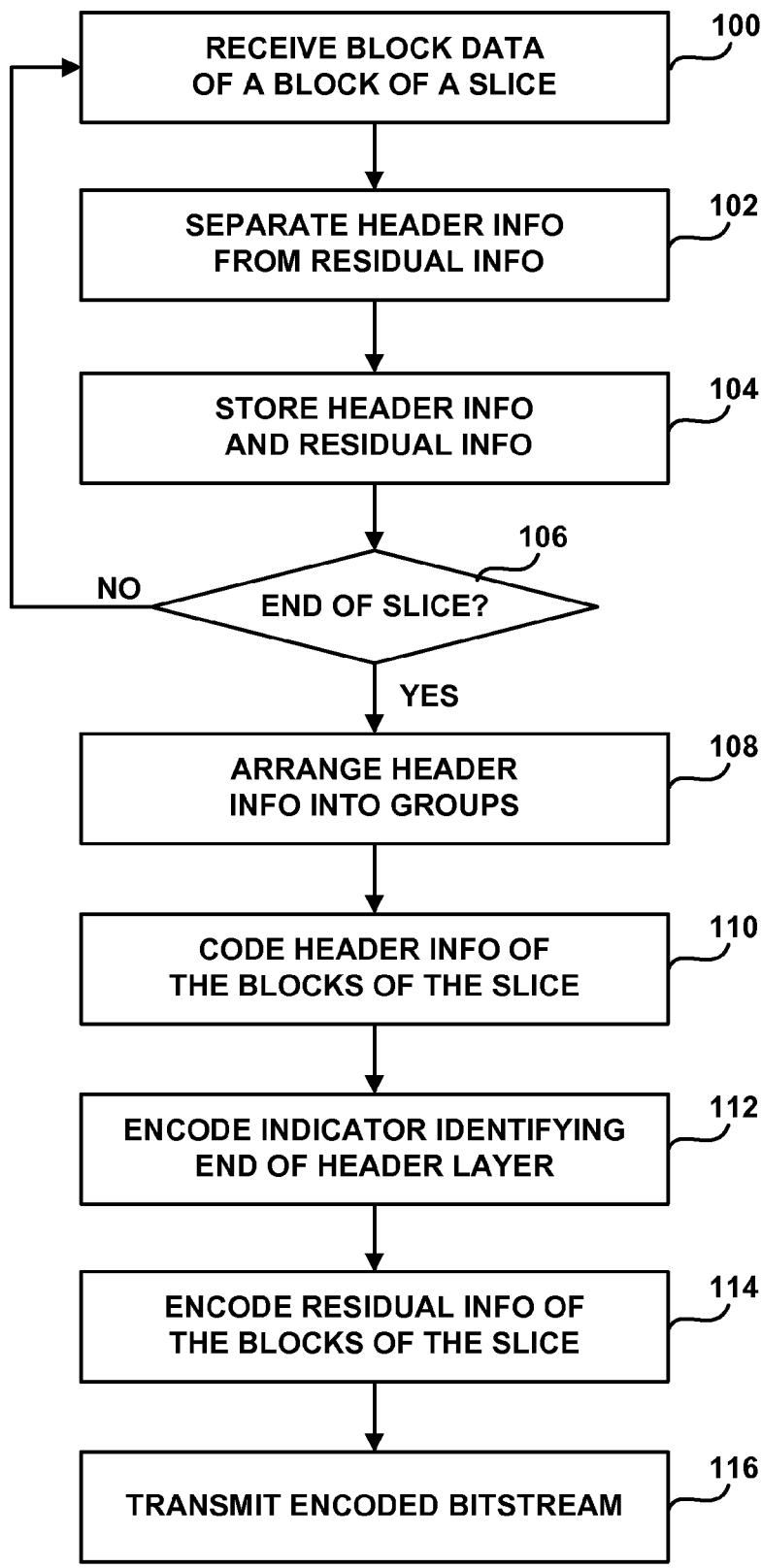
FIG. 8 is a flow diagram illustrating example operation of an entropy encoding unit generating a layered encoded bitstream.

FIG. 8 is a flow diagram illustrating example operation of an entropy encoding unit 46 generating a layered encoded bitstream. Entropy encoding unit 46 receives block data for a video block of a slice (100). Entropy encoding unit 46 may receive the block data from other components of video encoder 20, e.g., quantization unit 40 or motion estimation unit 32. The received block data may include residual information (e.g., in the form of quantized residual coefficients) and header information (e.g., in the form of one or more header syntax elements, such as one or more motion vectors, a block type, a prediction mode, a partition size, a coded block pattern, a delta QP, transform size and the like).

Block data separation module 50 separates the header information of the block from the residual information of the block (102). Block data separation module 50 may store the header information and residual information in one or more memory modules (104). In some instances, the memory modules may be separate memory modules. In other instances, the memory modules may be the same memory module.

Entropy encoding unit 46 determines whether the block is the end of the slice (106). When the block is not the last block of the slice, entropy encoding unit receives block data for a subsequent block, separates the header information of the subsequent block from the residual information of the subsequent block and stores the separated block information.

When the block is the last block of the slice, header grouping module 54 arranges the header information of the blocks of the slice to exploit the correlation of the header information among the blocks of the slice using run-length coding (108). Header grouping module 54 may group the header syntax elements of each of the blocks into groups based on the type of the header syntax elements. For example, header grouping module may group block type syntax elements of the blocks into a block type syntax element group. Header grouping module 54 may also generate similar groups for other header syntax elements, such as prediction mode, partition size, motion vector, CBP, QP, transformation size and the like.

Entropy encoding unit 46 encodes the header information of the blocks of the slice into a header layer (110). For example, RLC module 58 run-length encodes each of the groups of header syntax elements to reduce the redundancy and exploit the correlation of the header syntax elements among the blocks of the slice. In one instance, RLC module 58 encodes runs of a first header syntax element of the blocks, followed by runs of a second syntax element of the blocks and so on until RLC module 58 encodes runs for the last syntax element of the blocks. Alternatively, RLC module 58 encodes runs of the header syntax elements such that the runs of various header syntax elements are interleaved among one another. Following generation of the runs of syntax elements of the blocks of the slice, VLC module 59 encodes the runs of the syntax elements to generate the header layer of the layered bitstream.

Entropy encoding unit 46 may also encode an indicator identifying the end of the header layer (112). In one instance, VLC module 59 may encode a unique pattern of bits that indicates the end of the header layer. Alternatively, VLC module 59 may encode a syntax element at the beginning of the header layer that indicates a length, e.g., in bits, of the header layer.

Entropy encoding unit 46 also encodes the residual information of each of the blocks to generate a residual layer of the layered bitstream (114). Entropy encoding unit 46 may encode the residual information using VLC or arithmetic coding. In this manner, entropy encoding unit generates a layered encoded bitstream that includes a first sequence of bits that corresponds with the header information of the blocks and a second sequence of bits that corresponds with the residual information of the blocks. Entropy encoding unit 46 transmits the layered encoded bitstream (116).

Figure 9:
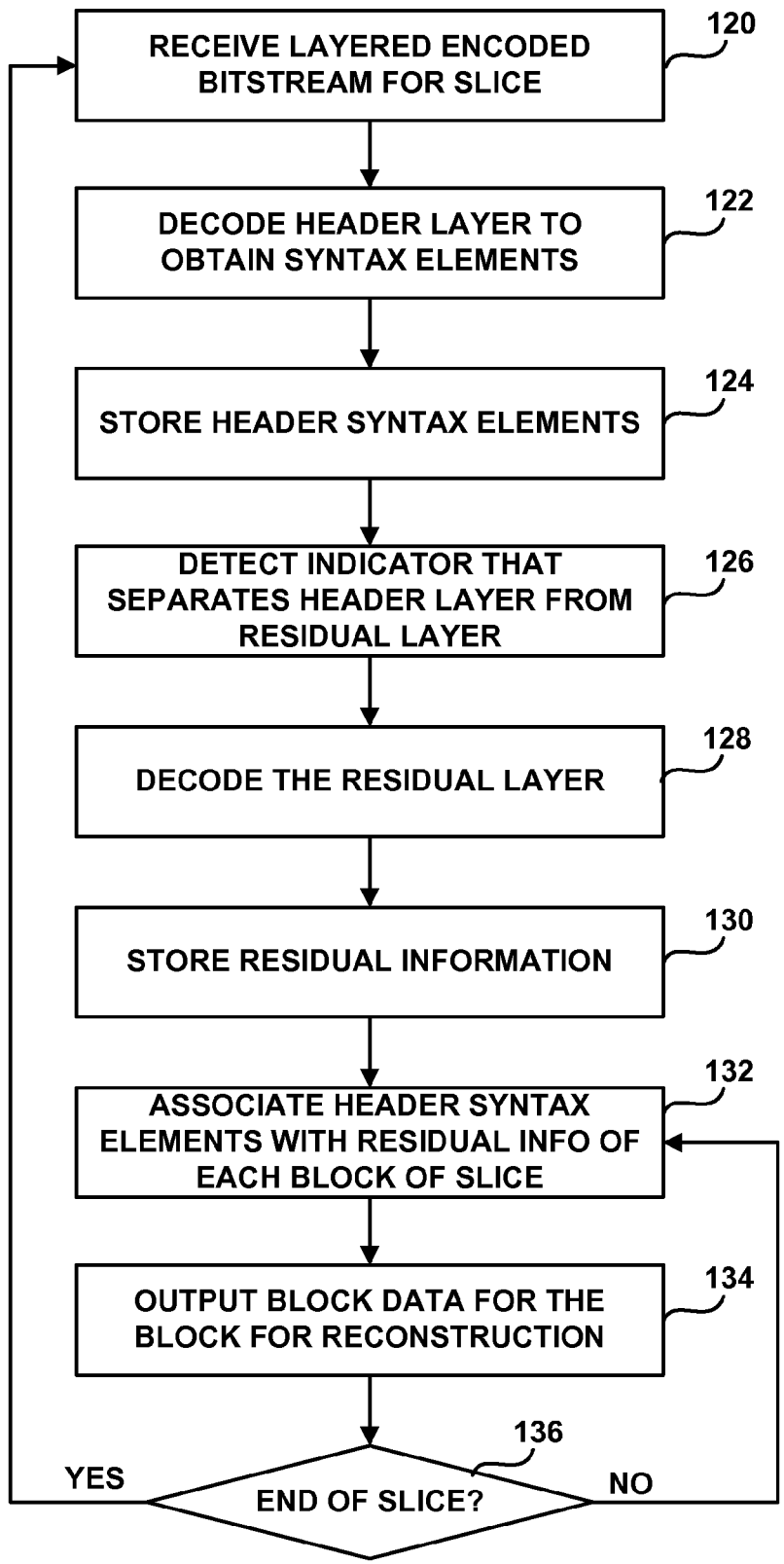
FIG. 9 is a flow diagram illustrating example operation of an entropy decoding unit decoding a layered encoded bitstream.

FIG. 9 is a flow diagram illustrating example operation of entropy decoding unit 60 decoding a layered encoded bitstream. Entropy decoding unit 60 receives a layered encoded video bitstream of a slice (120). Entropy decoding unit 60 decodes the header layer of the bitstream to obtain header syntax elements of the blocks of the slice (122). VLC decoding module 72 applies variable length decoding techniques, e.g., using one or more variable length coding tables, to decode header layer. After performing variable length decoding of the header layer, RLC decoding module 74 run-length decodes the header layer to obtain the header information for the blocks of the slice.

The decoded header information includes a number of syntax elements that are grouped based on the types of syntax elements. In one example, the syntax elements may be grouped such that syntax elements of a first type (e.g., block type) for all the blocks of the slice are grouped together, syntax elements of a second type (e.g., prediction mode) for all blocks of the slice are grouped together and so on. Alternatively, the syntax elements of the header information may be interleaved among one another. For example, at least one run for each syntax element may be encoded prior to encoding additional runs of any of the syntax elements. The additional runs of syntax elements are encoded when the previous run of the same syntax element ends. In this manner, the additional runs of syntax elements are encoded in locations where the syntax elements are needed for decoding the current block, thereby reducing the complexity of associating the header syntax elements and the residual information at the decoder. Entropy decoding unit 60 stores the header syntax elements (124)

Entropy decoding unit 60 detects an indicator that identifies the transition from the header layer to the residual layer (126). Upon detecting the transition from the header layer to the residual layer, VLC decoding module 72 decodes the residual layer of the bitstream (128). VLC decoding module 72 may, in some instances, select a different set of coding tables for decoding the residual layer. VLC decoding module 72 stores the residual information (130).

Header association module 79 associates the residual information of a first block of the slice with the header syntax elements of the block (132). For example, header association module 79 may associate residual information of the first block of the slice with the first value of each of the header syntax elements of the decoded header layer. Entropy decoding unit 60 outputs the block data of the block to other components of video decoder 26 for reconstruction of the block (134). In some instances, header association module 79 may output portions of the block data to different components of the video decoder as described above in FIG. 4.

Entropy decoding unit 60 determines whether the block is the end of the slice (136). When the block is not the last block of the slice, entropy decoding unit 60 associates the residual information of a subsequent block of the slice with the header syntax elements of the subsequent block. When the block is the last block of the slice, entropy decoding unit 60 waits to receive another layered encoded bitstream.

Figure 10:
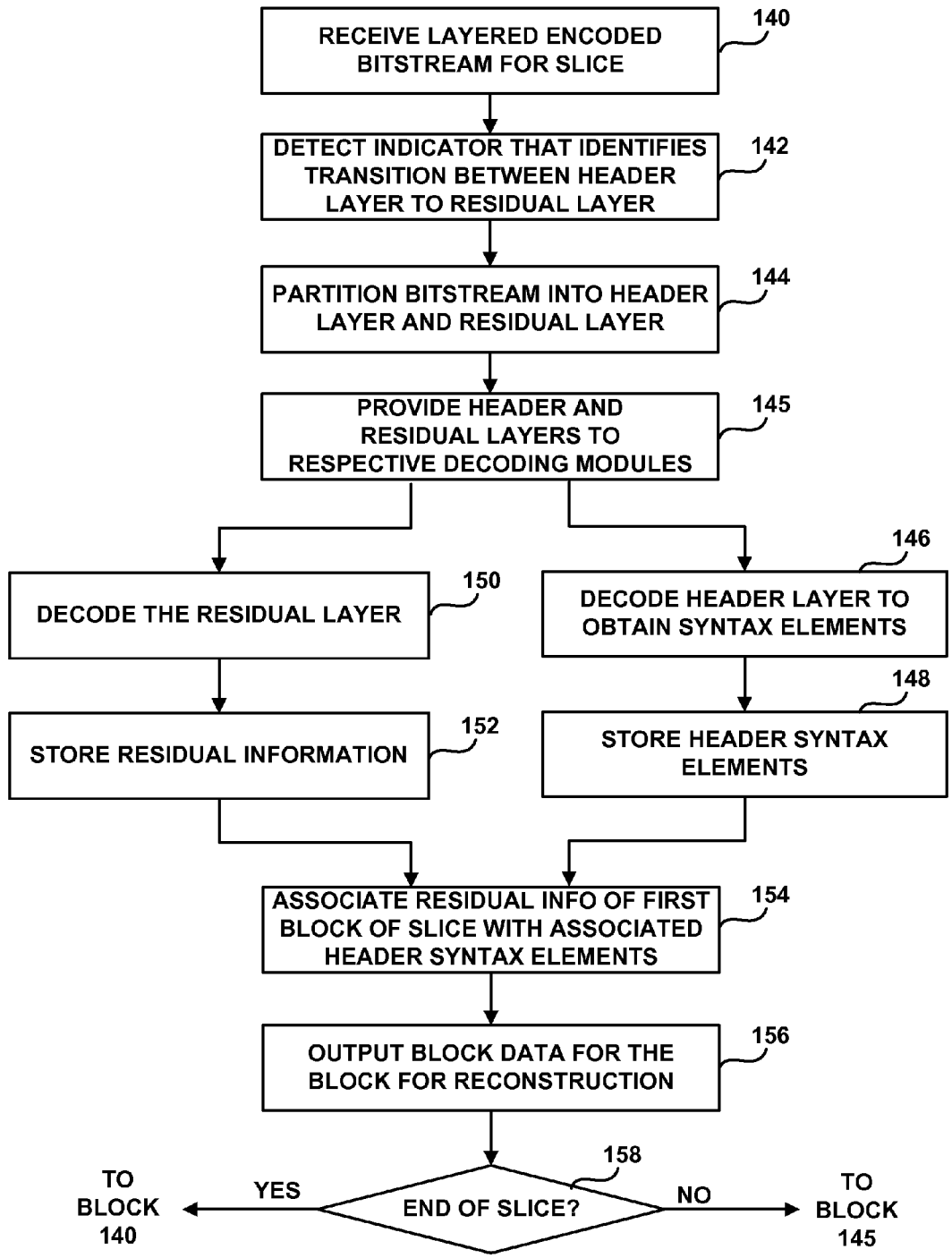
FIG. 10 is a flow diagram illustrating example operation of an entropy decoding unit decoding an interleaved layered encoded bitstream.

FIG. 10 is a flow diagram illustrating example operation of entropy decoding unit 80 decoding an interleaved layered encoded bitstream. Entropy decoding unit 80 receives the interleaved layered encoded video bitstream of a slice (140). Entropy decoding unit 80 detects an indicator in the interleaved layered bitstream that identifies a transition between the header layer and the residual layer (142). Entropy decoding unit 80 partitions the bitstream into a header layer and residual layer (144). Entropy decoding unit 80 provides header decoding module 84 with the encoded header layer and provides residual decoding module 85 with the encoded residual layer (146).

Entropy decoding unit 80 decodes the header layer of the bitstream to obtain header syntax elements of the blocks of the slice (146). Header decoding module 84 of entropy decoding unit 80 may use VLC or arithmetic decoding techniques to obtain the runs of header syntax elements, and run-length decode the runs to obtain the header syntax elements. The interleaved layered bitstream is arranged with runs of different header syntax elements interleaved among one another. Subsequent runs of a syntax element occur when the previous run of the same syntax element ends. In this manner, encoded runs of syntax elements are placed at locations where the syntax elements are needed for decoding the current block, thereby reducing the complexity of associating the header syntax elements and the residual information at the decoder. Entropy decoding unit 80 stores the decoded header syntax elements of a portion of the bitstream in header information memory 86 (148).

Entropy decoding unit 80 decodes the residual information to obtain residual transform coefficients (150). Residual decoding module 85 of entropy decoding unit 85 may decode the residual layer using VLC or arithmetic coding techniques to obtain the residual transform coefficients. Entropy decoding unit 18 stores the residual transform coefficients in residual information memory 88 (152). Entropy decoding unit 80 may decode the residual layer and the header layer concurrently, thus reducing decoding delay and memory requirement incurred by storing the decoded header information and residual information for the entire coded unit (e.g. slice).

Entropy decoding unit 80 associates the residual information of a first block of the slice with the corresponding header syntax of the block to generate block data for the first block (154). Entropy decoding unit 80 outputs the block data for the first block for reconstruction of the first block by other components of entropy decoding unit 80 (156). For example, header association module 89 may generate block data for a first block of the slice as soon as the residual information and the header information of the first block are decoded. In other words, header association module 89 may generate the block data for the first block while the entropy decoding unit 80 is still decoding the remainder of the header information and residual information.

Entropy decoding unit 80 determines whether the block is the end of the slice (158). When the block is not the last block of the slice, entropy decoding unit 80 associates the residual information of a subsequent block of the slice with the header syntax elements of the subsequent block as soon as the residual information and the header syntax elements of the subsequent block are available. In this manner, the interleaved arrangement of the header layer allows entropy decoding unit 80 to perform synchronized block-by-block decoding of the blocks of the slice with a reduced amount of delay and memory requirement. When the block is the last block of the slice, entropy decoding unit 80 waits to receive another layered encoded bitstream.

The techniques described in this disclosure may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

Various embodiments of the invention have been described. These and other embodiments are within the scope of the following claims.

The invention claimed is:

1. A method of encoding video data, the method comprising: encoding header information of a plurality of video blocks of a coded unit of video data in a first sequence of bits of an encoded bitstream, wherein encoding the header information includes arranging header syntax elements for each of the video blocks into groups of different types of header syntax elements, and interleaving encoded runs of portions of the groups of different types of header syntax elements within the first sequence of bits; and encoding residual information of the plurality of video blocks in a second sequence of bits of the encoded bitstream, wherein interleaving encoded runs of portions of the groups of header syntax elements within the first sequence of bits comprises encoding a first run for each of the groups of header syntax elements before encoding a second run of any of the groups of header syntax elements and encoding a second run for one of the groups of header syntax elements that has a shortest first run prior to encoding a second run for any other of the groups of header syntax elements.

2. The method of claim 1, wherein encoding the header information of the plurality of video blocks comprises run-length coding the header information of the plurality of video blocks.

3. The method of claim 1, wherein encoding the header information of the plurality of video blocks in the first sequence of bits of an encoded bitstream comprises encoding runs of at least some of the groups of header syntax elements sequentially to generate the first sequence of bits.

4. The method of claim 1, wherein the header syntax elements include at least one of a block type, a prediction mode, a partition size, a coded block pattern, a motion vector, a change of quantization parameter from previous block (delta QP) or a transform size.

5. The method of claim 1, further comprising transmitting the first sequence of bits before the second sequence of bits.

6. The method of claim 1, further comprising encoding an indicator that identifies a location within the encoded bitstream at which a transition from the first sequence of bits to the second sequence of bits occurs.

7. The method of claim 6, wherein encoding the indicator comprises encoding one of a unique sequence of bits at the location of the transition or a syntax element that indicates a length of the first sequence of bits.

8. The method of claim 1, wherein the coded unit comprises a first coded unit that includes the encoded header information of the plurality of video blocks as the first sequence of bits and the encoded residual information for the plurality of video blocks as the second sequence of bits, the method further comprising encoding a second coded unit block by block such that header information for each block of the second coded data unit is followed by the residual information for a corresponding block.

9. The method of claim 1, wherein the coded unit comprises one of a slice or a frame.

10. The method of claim 1, wherein encoding at least one of the header information or the residual information comprises encoding at least one of the header information or the residual information using variable length coding or arithmetic coding.

11. The method of claim 1, wherein interleaving encoded runs of portions of the groups of different types of header syntax elements within the first sequence of bits comprises:
encoding a first run for a first group of header syntax elements of the video blocks; and encoding a first run for at least a second group of header syntax elements of the video blocks before encoding a second run for the first group of header syntax elements, wherein the header syntax elements of the first group have different values in the first run and the second run.

12. An encoding device comprising:

a first encoding module configured to encode header information of a plurality of video blocks of a coded unit of video data in a first sequence of bits of an encoded bitstream, wherein the first encoding module arranges header syntax elements for each of the video blocks into groups of different types of header syntax elements, and interleaves encoded runs of portions of the groups of different types of header syntax elements within the first sequence of bits; and a second encoding module configured to encode residual information of the plurality of video blocks in a second sequence of bits of the encoded bitstream, wherein the first encoding module encodes runs of at least some of the groups of header syntax elements sequentially to generate the first sequence of bits, wherein the first encoding module encodes a first run for each of the groups of header syntax elements before encoding a second run of any of the groups of header syntax elements, and wherein the first encoding module encodes the second run for one of the groups of header syntax elements that has a shortest first run prior to encoding the second run for any other of the groups of header syntax elements.

13. The device of claim 12, wherein the first encoding module comprises a run-length coding module that run-length codes the header information of the plurality of video blocks.

14. The device of claim 12, wherein the header syntax elements include at least one of a block type, a prediction mode, a partition size, a coded block pattern, a motion vector, a change of quantization parameter from previous block (delta QP) or a transform size.

15. The device of claim 12, further comprising a transmitter that transmits the first sequence of bits before the second sequence of bits.

16. The device of claim 12, wherein the first encoding module encodes an indicator that identifies a location within the encoded bitstream at which a transition from the first sequence of bits to the second sequence of bits occurs.

17. The device of claim 16, wherein the first encoding module encodes one of a unique sequence of bits at the location of the transition or a syntax element that indicates a length of the first sequence of bits.

18. The device of claim 12, wherein the coded unit comprises a first coded unit that includes the encoded header information of the plurality of video blocks as the first sequence of bits and the encoded residual information for the plurality of video blocks as the second sequence of bits, and the at least one of the first or second encoding modules encodes a second coded unit block by block such that header information for each block of the second coded data unit is followed by the residual information for a corresponding block.

19. The device of claim 12, wherein the coded unit comprises one of a slice or a frame.

20. The device of claim 12, wherein the device comprises a wireless communication device.

21. The device of claim 12, wherein the encoding device encodes data using one of variable length coding or arithmetic coding.

22. The device of claim 12, wherein the first encoding module:
  encodes a first run for a first group of header syntax elements of the video blocks; and
  encodes a first run for at least a second group of header syntax elements of the video blocks before encoding a second run for the first group of header syntax elements, wherein the header syntax elements of the first group have different values in the first run and the second run.

23. A non-transitory computer-readable medium comprising instructions to cause at least one processor to:
  encode header information of a plurality of video blocks of a coded unit of video data in a first sequence of bits of an encoded bitstream, wherein the instructions that cause the at least one processor to encode the header information cause the processor to arrange header syntax elements for each of the video blocks into groups of different types of header syntax elements, and interleave encoded runs of portions of the groups of different types of header syntax elements within the first sequence of bits; and
  encode residual information of the plurality of video blocks in a second sequence of bits of the encoded bitstream,
  wherein instructions to cause the at least one processor to interleave encoded runs of portions of the groups of header syntax elements within the first sequence of bits comprise instructions to cause the at least one processor to encode a first run for each of the groups of header syntax elements before encoding a second run of any of the groups of header syntax elements and to encode a second run for one of the groups of header syntax elements that has a shortest first run prior to encoding a second run for any other of the groups of header syntax elements.

24. The non-transitory computer-readable medium of claim 23, wherein instructions to cause the at least one processor to encode the header information of the plurality of video blocks comprise instructions to cause the at least one processor to run-length code the header information of the plurality of video blocks.

25. The non-transitory computer-readable medium of claim 23, wherein instructions to cause the at least one processor to encode header information of the plurality of video blocks in the first sequence of bits of an encoded bitstream comprise instructions to cause the at least one processor to encode runs of at least some of the groups of header syntax elements sequentially to generate the first sequence of bits.

26. The non-transitory computer-readable medium of claim 23, wherein the header syntax elements include at least one of a block type, a prediction mode, a partition size, a coded block pattern, a motion vector, a change of quantization parameter from previous block (delta QP) or a transform size.

27. The non-transitory computer-readable medium of claim 23, further comprising instructions to cause the at least one processor to transmit the first sequence of bits before the second sequence of bits.

28. The non-transitory computer-readable medium of claim 23, further comprising instructions to cause the at least one processor to encode an indicator that identifies a location within the encoded bitstream at which a transition from the first sequence of bits to the second sequence of bits occurs.

29. The non-transitory computer-readable medium of claim 28, wherein instructions to cause the at least one processor to encode the indicator comprise instructions to cause the at least one processor to encode one of a unique sequence of bits at the location of the transition or a syntax element that indicates a length of the first sequence of bits.

30. The non-transitory computer-readable medium of claim 23, wherein the coded unit comprises a first coded unit that includes the encoded header information of the plurality of video blocks as the first sequence of bits and the encoded residual information for the plurality of video blocks as the second sequence of bits, the computer-readable medium further comprising instructions to cause the at least one processor to encode a second coded unit block by block such that header information for each block of the second coded data unit is followed by the residual information for a corresponding block.

31. The non-transitory computer-readable medium of claim 23, wherein the coded unit comprises one of a slice or a frame.

32. The non-transitory computer-readable medium of claim 23, wherein instructions to cause the at least one processor to encode at least one of the header information or the residual information comprise instructions to encode at least one of the header information or the residual information using variable length coding or arithmetic coding.

33. The non-transitory computer-readable medium of claim 23, wherein the instructions that cause the at least one processor to interleave encoded runs of portions of the groups of different types of header syntax elements within the first sequence of bits, cause the processor to:
  encode a first run for a first group of header syntax elements of the video blocks; and
  encode a first run for a second group of header syntax elements of the video blocks before encoding a second run for the first group of header syntax elements, wherein the header syntax elements of the first group have different values in the first run and the second run.

34. An encoding device comprising:
  means for encoding header information of a plurality of video blocks of a coded unit of video data in a first sequence of bits of an encoded bitstream, wherein the header information encoding means arranges header syntax elements for each of the video blocks into groups of different types of header syntax elements, and interleaves encoded runs of portions of the groups of different types of header syntax elements within the first sequence of bits; and
  means for encoding residual information of the plurality of video blocks in a second sequence of bits of the encoded bitstream,
  wherein the header information encoding means encodes a first run for each of the groups of header syntax elements before encoding a second run of any of the groups of header syntax elements, and
  wherein the header information encoding means encodes the second run for one of the groups of header syntax elements that has a shortest first run prior to encoding a second run for any other of the groups of header syntax elements.

35. The device of claim 34, wherein the header information encoding means run-length codes the header information of the plurality of video blocks.

36. The device of claim 34, wherein the header information encoding means encodes runs of at least some of the groups of header syntax elements sequentially to generate the first sequence of bits.

37. The device of claim 34, wherein the header syntax elements include at least one of a block type, a prediction mode, a partition size, a coded block pattern, a motion vector, a change of quantization parameter from previous block (delta QP) or a transform size.

38. The device of claim 34, further comprising means for transmitting the first sequence of bits before the second sequence of bits.

39. The device of claim 34, wherein the header information encoding means encodes an indicator that identifies a location within the encoded bitstream at which a transition from the first sequence of bits to the second sequence of bits occurs.

40. The device of claim 39, wherein the header information encoding means encodes one of a unique sequence of bits at the location of the transition or a syntax element that indicates a length of the first sequence of bits.

41. The device of claim 34, wherein the coded unit comprises a first coded unit that includes the encoded header information of the plurality of video blocks as the first sequence of bits and the encoded residual information for the plurality of video blocks as the second sequence of bits, the device further comprising means for encoding a second coded unit block by block such that header information for each block of the second coded data unit is followed by the residual information for a corresponding block.

42. The device of claim 34, wherein the coded unit comprises one of a slice or a frame.

43. The device of claim 34, wherein the encoding device encodes data using one of variable length coding or arithmetic coding.

44. The encoding device of claim 34, wherein the header information encoding means:
encodes a first run for a first group of header syntax elements of the video blocks; and
encodes a first run for a second group of header syntax elements of the video blocks before encoding a second run for the first group of header syntax elements, wherein the header syntax elements of the first group have different values in the first run and the second run.

45. A method of decoding video data, the method comprising:
decoding a first sequence of bits of an encoded bitstream to obtain header information of a plurality of video blocks of a coded unit, wherein the header information of the plurality of video blocks is arranged into groups of different types of header syntax elements, and includes interleaved encoded runs of portions of the groups of different types of header syntax elements within the first sequence of bits;
decoding a second sequence of bits of the encoded bitstream to obtain residual information of the plurality of video blocks; and
associating residual information of each of the plurality of video blocks with corresponding header information,
wherein decoding the first sequence of bits that includes the interleaved encoded runs of portions of the groups of header syntax elements within the first sequence of bits comprises decoding a first run for each of the groups of header syntax elements before decoding a second run of any of the groups of header syntax elements and decoding the second run for one of the groups of header syntax elements that has a shortest first run prior to decoding the second run for any other of the groups of header syntax elements.

46. The method of claim 45, wherein associating the residual information of each of the plurality of video blocks with the corresponding header information comprises associating the residual information of each of the plurality of video blocks with a plurality of corresponding header syntax elements.

47. The method of claim 45, further comprising detecting an indicator within the encoded bitstream that identifies a location at which the first sequence of bits ends and the second sequence of bits begins.

48. The method of claim 45, further comprising reconstructing each of the video blocks of the coded unit using the residual information of a corresponding video block and the corresponding header information.

49. The method of claim 48, wherein reconstructing each of the video blocks comprises reconstructing each video block of the coded unit as soon as the corresponding header information and the residual information are decoded.

50. The method of claim 48, wherein reconstructing each of the video blocks comprises reconstructing each video block of the coded unit concurrently with decoding the remaining portion of the first sequence of bits and the second sequence of bits of the coded unit.

51. The method of claim 45, wherein decoding the first sequence of bits to obtain the header information and decoding the second sequence of bits to obtain the residual information comprises decoding the first sequence of bits and the second sequence of bits concurrently.

52. A decoding device comprising:
at least one decoder module configured to decode a first sequence of bits of an encoded bitstream to obtain header information of a plurality of video blocks of a coded unit, wherein the header information of the plurality of video blocks is arranged into groups of different types of header syntax elements, and includes interleaved encoded runs of portions of the groups of different types of header syntax elements within the first sequence of bits, and decodes a second sequence of bits of the encoded bitstream to obtain residual information of the plurality of video blocks; and
a header association module configured to associate the residual information of each of the plurality of video blocks with corresponding header information,
wherein to decode the first sequence of bits that includes the interleaved encoded runs of portions of the groups of header syntax elements within the first sequence of bits the at least one decoder module is configured to decode a first run for each of the groups of header syntax elements before decoding a second run of any of the groups of header syntax elements and decode the second run for one of the groups of header syntax elements that has a shortest first run prior to decoding the second run for any other of the groups of header syntax elements.

53. The device of claim 52, wherein the header association module associates the residual information of each of the plurality of video blocks with a plurality of corresponding header syntax elements.

54. The device of claim 52, wherein the at least one decoder module detects an indicator within the encoded bitstream that identifies a location at which the first sequence of bits ends and the second sequence of bits begins.

55. The device of claim 52, wherein the at least one decoder module is configured to reconstruct each of the video blocks of the coded unit using the residual information of a corresponding video block and the corresponding header information.

56. The device of claim 55, wherein the at least one decoder module is configured to reconstruct each of the video blocks of the coded unit as soon as the corresponding header information and the residual information are decoded.

57. The device of claim 55, wherein the at least one decoder module is configured to decode a first video block of the coded unit concurrently with the at least one decoder module decoding a portion of the first sequence of bits to obtain a second header information of a second video block of the coded unit.

58. The device of claim 52, wherein the device comprises a wireless communication device.

59. The device of claim 52, wherein the at least one decoder module decodes the first sequence of bits and the second sequence of bits concurrently.

60. A non-transitory computer-readable medium comprising instructions to cause at least one processor to:
    decode a first sequence of bits of an encoded bitstream to obtain header information of a plurality of video blocks of a coded unit, wherein the header information of the plurality of video blocks is arranged into groups of different types of header syntax elements, and includes interleaved encoded runs of portions of the groups of different types of header syntax elements within the first sequence of bits;
    decode a second sequence of bits of the encoded bitstream to obtain residual information of the plurality of video blocks; and
    associate residual information of each of the plurality of video blocks with corresponding header information,
    wherein the instructions to cause the at least one processor to decode the first sequence of bits that includes the interleaved encoded runs of portions of the groups of header syntax elements within the first sequence of bits comprises instructions to cause the at lease one processor to decode a first run for each of the groups of header syntax elements before decoding a second run of any of the groups of header syntax elements and decode the second run for one of the groups of header syntax elements that has a shortest first run prior to decoding the second run for any of the other groups of header syntax elements.

61. The non-transitory computer-readable medium of claim 60, wherein instructions to cause the at least one processor to associate the residual information of each of the plurality of video blocks with the corresponding header information comprise instructions to cause the at least one processor to associate the residual information of each of the plurality of video blocks with a plurality of corresponding header syntax elements.

62. The non-transitory computer-readable medium of claim 60, further comprising instructions to cause the at least one processor to detect an indicator within the encoded bitstream that identifies a location at which the first sequence of bits ends and the second sequence of bits begins.

63. The non-transitory computer-readable medium of claim 60, further comprising instructions to cause the at least one processor to reconstruct each of the video blocks of the coded unit using the residual information of a corresponding video block and the corresponding header information.

64. The non-transitory computer-readable medium of claim 63, wherein the instructions to cause the at least one processor to reconstruct each of the video blocks comprises instructions to reconstruct each video block of the coded unit as soon as the corresponding header information and the residual information are decoded.

65. The non-transitory computer-readable medium of claim 63, wherein the instructions to cause the at least one processor to reconstruct each of the video blocks comprises instructions to reconstruct a first video block of the coded unit concurrently with decoding a portion of the first sequence of bits to obtain a second header information of a second video block of the coded unit.

66. The non-transitory computer-readable medium of claim 60, further comprising instructions to cause the at least one processor to decode the first sequence of bits and the second sequence of bits concurrently.

67. A decoding device comprising:
    means for decoding a first sequence of bits of an encoded bitstream to obtain header information of a plurality of video blocks of a coded unit, wherein the header information of the plurality of video blocks is arranged into groups of different types of header syntax elements, and includes interleaved encoded runs of portions of the groups of different types of header syntax elements within the first sequence of bits, and a second sequence of bits of the encoded bitstream to obtain residual information of the plurality of video blocks; and
    means for associating residual information of each of the plurality of video blocks with corresponding header information,
    wherein the means for decoding the first sequence of bits that includes the interleaved encoded runs of portions of the groups of header syntax elements within the first sequence of bits comprises means for decoding a first run for each of the groups of header syntax elements before decoding a second run of any of the groups of header syntax elements and decoding the second run for one of the groups of header syntax elements that has a shortest first run prior to decoding the second run for any other of the groups of header syntax elements.

68. The device of claim 67, wherein the associating means associates the residual information of each of the plurality of video blocks with a plurality of corresponding header syntax elements.

69. The device of claim 67, further comprising means for detecting an indicator within the encoded bitstream that identifies a location at which the first sequence of bits ends and the second sequence of bits begins.

70. The device of claim 67, further comprising means for reconstructing each of the video blocks of the coded unit using the residual information of a corresponding video block and the corresponding header information.

71. The device of claim 70, wherein the reconstructing means reconstructs each video block of the coded unit as soon as the corresponding header information and the residual information are decoded.

72. The device of claim 70, wherein the reconstructing means reconstructs a first video block of the coded unit concurrently with the decoding means decoding a portion of the first sequence of bits to obtain a second header information of a second video block of the coded unit.

73. The device of claim 67, wherein the decoding means decodes the first sequence of bits and the second sequence of bits concurrently.

* * * * *